US012706875B2

(12) United States Patent
Lee et al.

(10) Patent No.: US 12,706,875 B2
(45) Date of Patent: Aug. 11, 2026

(54) METHODS AND SYSTEMS FOR COMMUNICATION SESSION MANAGEMENT

(71) Applicant: Comcast Cable Communications, LLC, Philadelphia, PA (US)

(72) Inventors: Yiu Lee, Philadelphia, PA (US); Charles Helfinstine, Philadelphia, PA (US); Thomas Modayil Jacob, Philadelphia, PA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 82 days.

(21) Appl. No.: 18/957,133

(22) Filed: Nov. 22, 2024

(65) Prior Publication Data

US 2025/0088482 A1 Mar. 13, 2025

Related U.S. Application Data

(63) Continuation of application No. 18/488,666, filed on Oct. 17, 2023, now Pat. No. 12,192,167, which is a continuation of application No. 17/464,443, filed on Sep. 1, 2021, now Pat. No. 11,831,601.

(51) Int. Cl.

| | |
|---|---|
| ***H04L 61/4511*** | (2022.01) |
| ***H04L 67/02*** | (2022.01) |
| ***H04L 67/14*** | (2022.01) |
| ***H04L 67/141*** | (2022.01) |

(52) U.S. Cl.

CPC .......... *H04L 61/4511* (2022.05); *H04L 67/02* (2013.01); *H04L 67/14* (2013.01); *H04L 67/141* (2013.01)

(58) Field of Classification Search

None

See application file for complete search history.

(56) References Cited

U.S. PATENT DOCUMENTS

| | | | | |
|---|---|---|---|---|
| 8,886,721 | B2 * | 11/2014 | Michaelis | H04M 3/436 709/204 |
| 8,948,132 | B2 * | 2/2015 | Chaturvedi | H04L 67/142 455/435.2 |
| 8,995,439 | B2 * | 3/2015 | Field | H04N 21/6405 370/432 |
| 9,021,109 | B1 * | 4/2015 | Gigliotti | H04L 67/1001 709/228 |

(Continued)

OTHER PUBLICATIONS

Hoffman et al., "DNS Queries over HTTPS (DoH)", Oct. 2018, Internet Engineering Task Force (IETF), Request for Comments 8484, pp. 1-21 (Year: 2018).*

(Continued)

*Primary Examiner* — Lashonda Jacobs-Burton

(74) *Attorney, Agent, or Firm* — Ballard Spahr LLP

(57) ABSTRACT

A network device (e.g., a server, a domain name system (DNS) server, a DNS over Hypertext Transfer Protocol Secure (HTTPS) server (DoH server), a network management device, etc.) may determine a time duration, such as a time duration, based on a request for a communication session from a device. In response, the network device may determine a modified time duration for the communication session based on a type of the device, type of user associated with the device, and/or type of an application requesting the communication session.

34 Claims, 13 Drawing Sheets

(56) References Cited

U.S. PATENT DOCUMENTS

| | | | | |
|---|---|---|---|---|
| 10,462,529 | B2 * | 10/2019 | Xu | H04N 21/654 |
| 10,623,501 | B2 | 4/2020 | Mathew et al. | |
| 10,742,758 | B2 * | 8/2020 | Yoshida | G06Q 10/0639 |
| 10,855,654 | B2 * | 12/2020 | Moore | H04L 65/60 |
| 10,951,652 | B1 * | 3/2021 | Sharifi Mehr | H04L 63/0807 |
| 11,184,412 | B1 | 11/2021 | George et al. | |
| 11,463,429 | B2 * | 10/2022 | Appala | H04L 63/083 |
| 2008/0148326 | A1 * | 6/2008 | Qin | H04N 21/4667<br>348/E7.071 |
| 2008/0159318 | A1 * | 7/2008 | Pierlot | G06F 21/335<br>370/412 |
| 2011/0264813 | A1 * | 10/2011 | Nair | H04L 65/1089<br>709/228 |
| 2013/0204920 | A1 * | 8/2013 | Doleh | H04L 63/08<br>709/201 |
| 2016/0380961 | A1 * | 12/2016 | Backholm | H04L 69/22<br>709/245 |
| 2022/0353233 | A1 | 11/2022 | Helfinstine et al. | |

OTHER PUBLICATIONS

Rescorla, E., "The Transport Layer Security (TLS) Protocol Version 1.3," Internet Engineering Task Force (IETF), 2018, pp. 1-160.
U.S. Appl. No. 18/488,666, (2024/0129272), filed Oct. 17, 2023 (Apr. 18, 2024), Yiu Lee (Comcast Cable Communications, LLC).
U.S. Appl. No. 17/464,443 (2023/0069337), filed Sep. 1, 2021 (Mar. 2, 2023), Yiu Lee (Comcast Cable Communications, LLC).

* cited by examiner

200

USER DEVICE
102
NETWORK
DEVICE
104
201
202
203
204
205
206
207
208
209
210
211
212

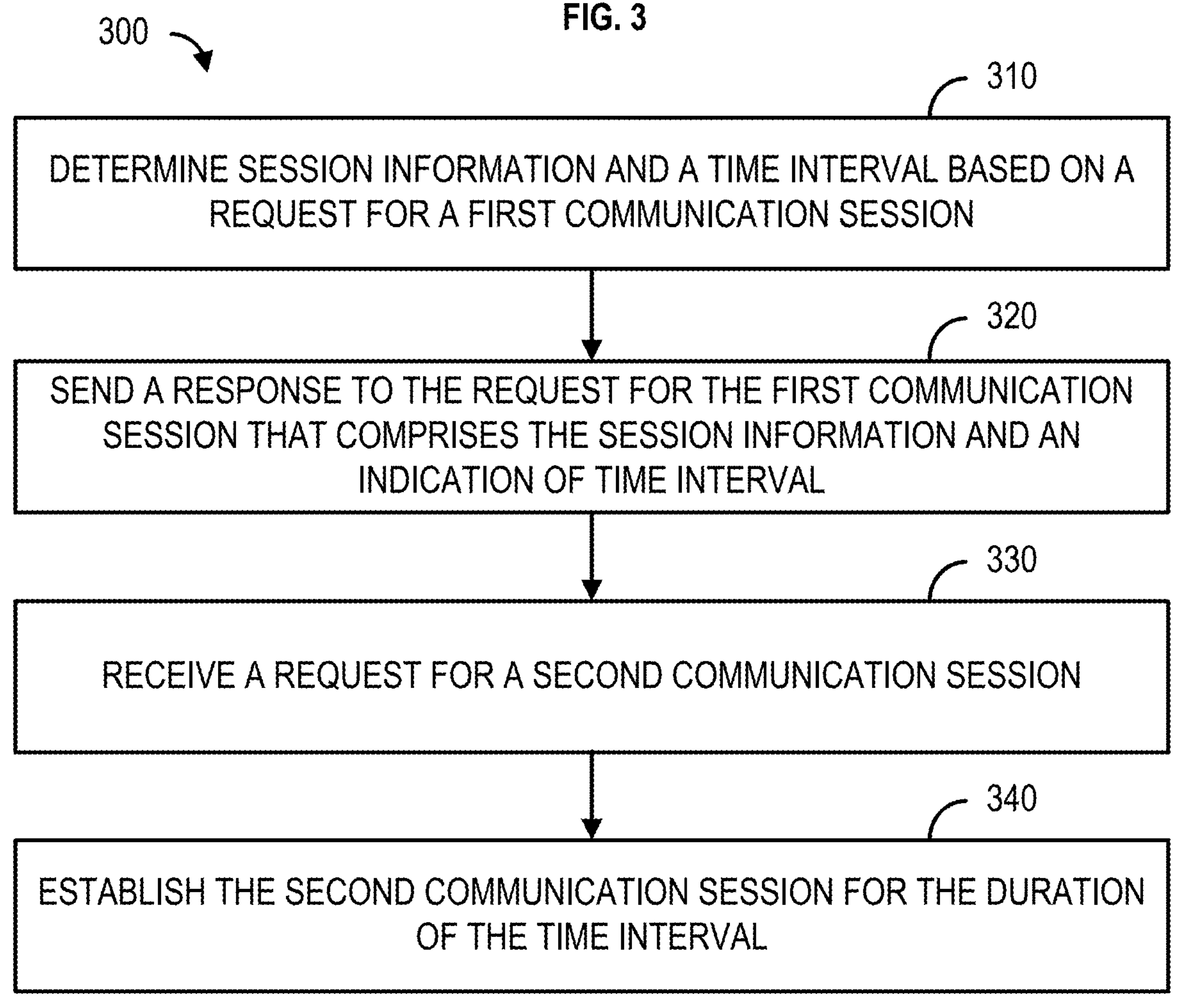
FIG. 3
300
310
DETERMINE SESSION INFORMATION AND A TIME INTERVAL BASED ON A REQUEST FOR A FIRST COMMUNICATION SESSION
320
SEND A RESPONSE TO THE REQUEST FOR THE FIRST COMMUNICATION SESSION THAT COMPRISES THE SESSION INFORMATION AND AN INDICATION OF TIME INTERVAL
330
RECEIVE A REQUEST FOR A SECOND COMMUNICATION SESSION
340
ESTABLISH THE SECOND COMMUNICATION SESSION FOR THE DURATION OF THE TIME INTERVAL 400
410
SEND A REQUEST FOR A FIRST COMMUNICATION SESSION
420
RECEIVE SESSION INFORMATION AND AN INDICATION OF A TIME INTERVAL
430
SEND A REQUEST FOR A SECOND COMMUNICATION SESSION THAT COMPRISES THE SESSION INFORMATION AND THE INDICATION OF THE TIME INTERVAL
440
RECEIVE THE SECOND COMMUNICATION SESSION BASED ON THE SESSION INFORMATION AND DURING THE TIME INTERVAL 500
510
SEND A RESPONSE TO REQUEST FOR A FIRST COMMUNICATION SESSION THAT INCLUDES SESSION INFORMATION AND AN INDICATION OF A TIME INTERVAL
520
RECEIVE THE SESSION INFORMATION AND A REQUEST TO CONNECT TO A SECOND COMMUNICATION SESSION
530
DETERMINE THAT THE TIME INTERVAL IS ACTIVE
540
CAUSE A USER DEVICE TO CONNECT TO THE SECOND COMMUNICATION SESSION

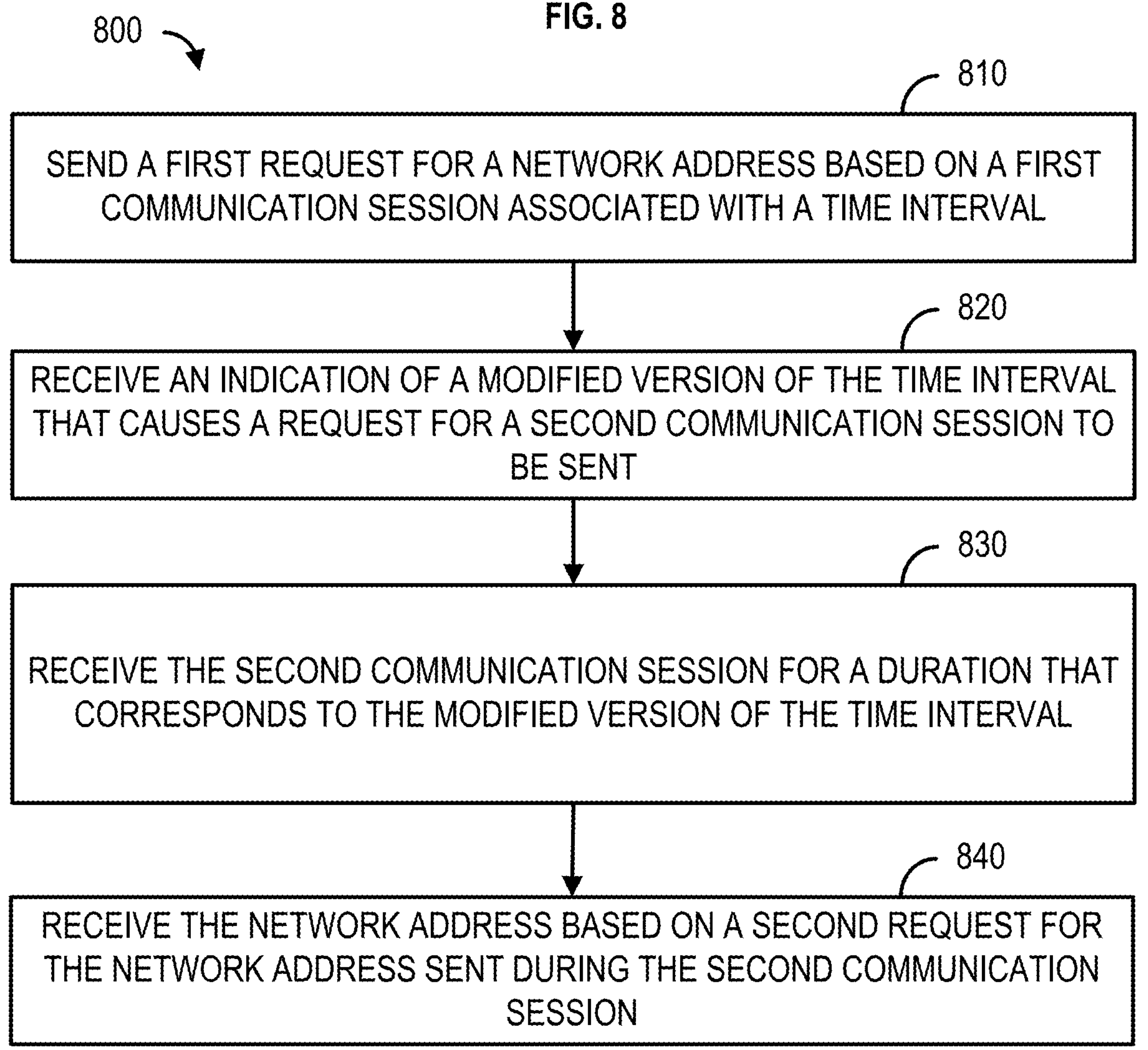
FIG. 8
800
810
SEND A FIRST REQUEST FOR A NETWORK ADDRESS BASED ON A FIRST COMMUNICATION SESSION ASSOCIATED WITH A TIME INTERVAL
820
RECEIVE AN INDICATION OF A MODIFIED VERSION OF THE TIME INTERVAL THAT CAUSES A REQUEST FOR A SECOND COMMUNICATION SESSION TO BE SENT
830
RECEIVE THE SECOND COMMUNICATION SESSION FOR A DURATION THAT CORRESPONDS TO THE MODIFIED VERSION OF THE TIME INTERVAL
840
RECEIVE THE NETWORK ADDRESS BASED ON A SECOND REQUEST FOR THE NETWORK ADDRESS SENT DURING THE SECOND COMMUNICATION SESSION

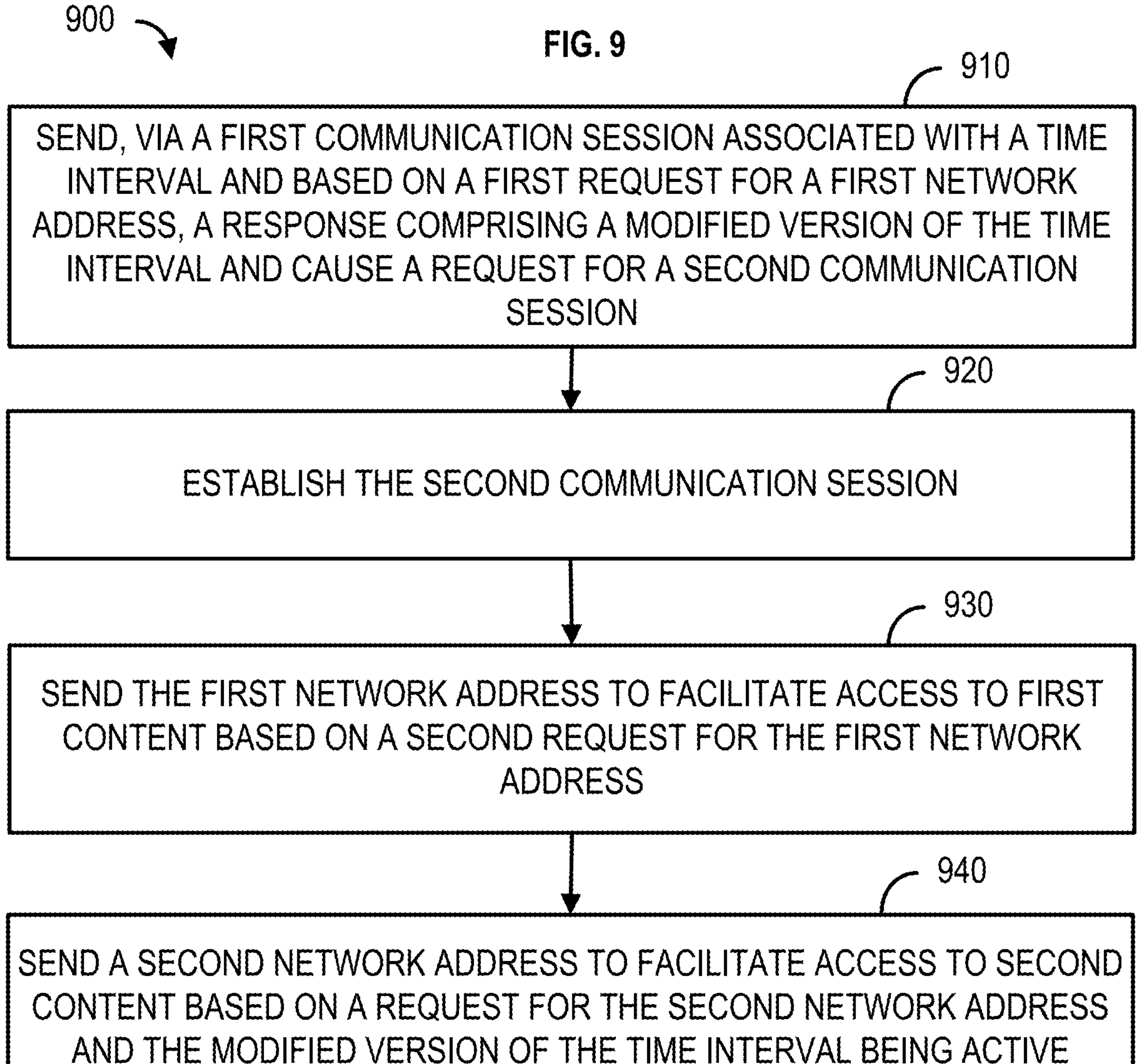
900
FIG. 9
910
SEND, VIA A FIRST COMMUNICATION SESSION ASSOCIATED WITH A TIME INTERVAL AND BASED ON A FIRST REQUEST FOR A FIRST NETWORK ADDRESS, A RESPONSE COMPRISING A MODIFIED VERSION OF THE TIME INTERVAL AND CAUSE A REQUEST FOR A SECOND COMMUNICATION SESSION
920
ESTABLISH THE SECOND COMMUNICATION SESSION
930
SEND THE FIRST NETWORK ADDRESS TO FACILITATE ACCESS TO FIRST CONTENT BASED ON A SECOND REQUEST FOR THE FIRST NETWORK ADDRESS
940
SEND A SECOND NETWORK ADDRESS TO FACILITATE ACCESS TO SECOND CONTENT BASED ON A REQUEST FOR THE SECOND NETWORK ADDRESS AND THE MODIFIED VERSION OF THE TIME INTERVAL BEING ACTIVE

1100

1110
RECEIVING, FOR A FIRST COMMUNICATION SESSION, A FIRST REQUEST FOR A NETWORK ADDRESS
1120
BASED ON THE FIRST REQUEST FOR THE NETWORK ADDRESS, DETERMINING A MODIFIED TIME DURATION
1130
SENDING A RESPONSE TO THE FIRST REQUEST FOR THE NETWORK ADDRESS
1140
ESTABLISHING, BASED ON A REQUEST FOR A SECOND COMMUNICATION SESSION, THE SECOND COMMUNICATION SESSION

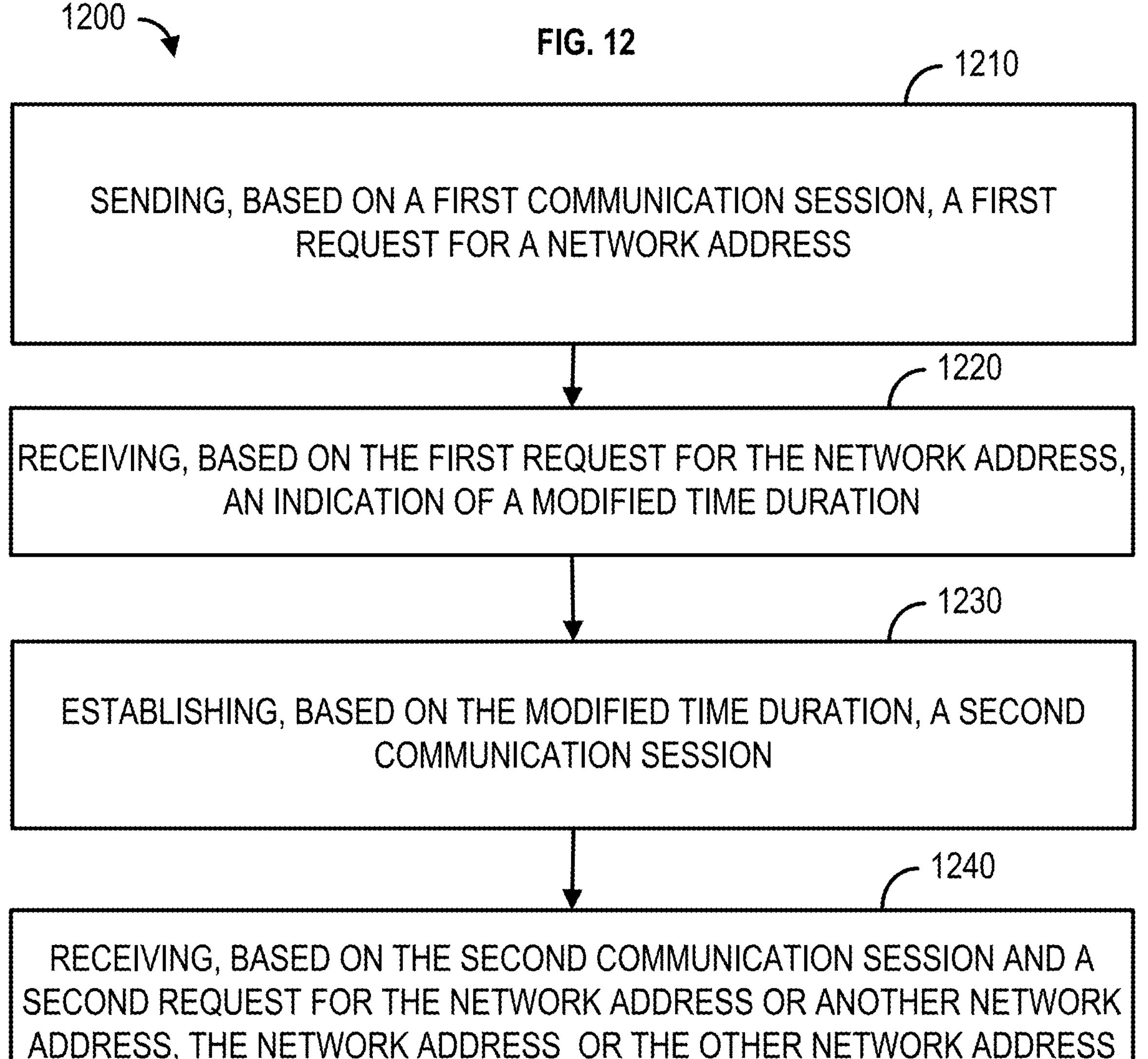
1200
FIG. 12
1210
SENDING, BASED ON A FIRST COMMUNICATION SESSION, A FIRST REQUEST FOR A NETWORK ADDRESS
1220
RECEIVING, BASED ON THE FIRST REQUEST FOR THE NETWORK ADDRESS, AN INDICATION OF A MODIFIED TIME DURATION
1230
ESTABLISHING, BASED ON THE MODIFIED TIME DURATION, A SECOND COMMUNICATION SESSION
1240
RECEIVING, BASED ON THE SECOND COMMUNICATION SESSION AND A SECOND REQUEST FOR THE NETWORK ADDRESS OR ANOTHER NETWORK ADDRESS, THE NETWORK ADDRESS OR THE OTHER NETWORK ADDRESS

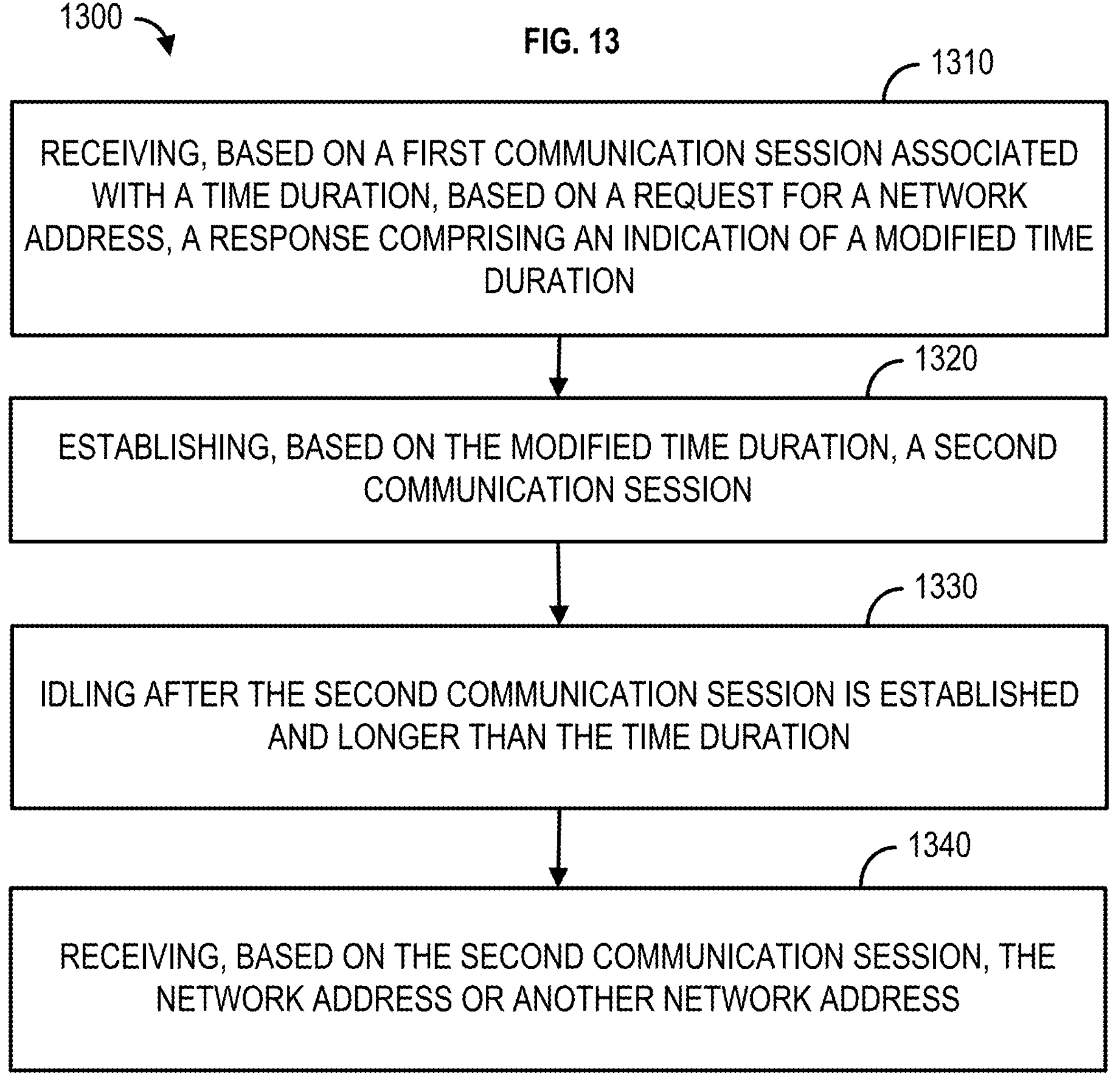
1300
FIG. 13
1310
RECEIVING, BASED ON A FIRST COMMUNICATION SESSION ASSOCIATED WITH A TIME DURATION, BASED ON A REQUEST FOR A NETWORK ADDRESS, A RESPONSE COMPRISING AN INDICATION OF A MODIFIED TIME DURATION
1320
ESTABLISHING, BASED ON THE MODIFIED TIME DURATION, A SECOND COMMUNICATION SESSION
1330
IDLING AFTER THE SECOND COMMUNICATION SESSION IS ESTABLISHED AND LONGER THAN THE TIME DURATION
1340
RECEIVING, BASED ON THE SECOND COMMUNICATION SESSION, THE NETWORK ADDRESS OR ANOTHER NETWORK ADDRESS

METHODS AND SYSTEMS FOR COMMUNICATION SESSION MANAGEMENT

CROSS REFERENCE TO RELATED PATENT APPLICATION

This application is a continuation of U.S. application Ser. No. 18/488,666, filed Oct. 17, 2023, which is a continuation of U.S. application Ser. No. 17/464,443, filed Sep. 1, 2021, now U.S. Pat. No. 11,831,601, which are herein incorporated by reference in their entirety.

BACKGROUND

Communication protocols, such as Domain Name System over Hypertext Transfer Protocol Secure (DoH) and Transport Layer Security (TLS), implement session management (e.g., session tokens, session identifiers, etc.) mechanisms, such as session token/identifiers, session timeout values, encryption, and/or the like to facilitate network security. For example, DoH uses HTTPS as a secure transport protocol, and HTTPS uses TLS to establish secure/encrypted communication channels. However, session management mechanisms implemented by different communication protocols may conflict. For example, TLS implements a default session time out duration of 300 seconds. If the TLS session is left idle for longer than 300 seconds, the session will terminate. For DoH, the time out duration of TLS may cause devices, such as mobile devices, content output devices, set-top boxes, and/or the like that transition to idle states (e.g., sleep modes). During a DoH session, for example, to save power and/or due to inactivity, devices or clients may have to have to establish a new session if the idle period exceeds the default time out duration of protocols such as TLS. Establishing a new session includes processes, such as a handshake process and/or an extended computational and/or process time, that may degrade a user experience.

SUMMARY

It is to be understood that both the following general description and the following detailed description are exemplary and explanatory only and are not restrictive. Methods and systems for communication session management are described.

A network device (e.g., a server, a domain name system (DNS) server, a DNS over Hypertext Transfer Protocol Secure (HTTPS) server (DoH server), a network management device, etc.) may determine a time duration, based on a request for a first communication session associated with a first communication protocol that may be used to modify (e.g., extend, shorten, etc.) the duration of a second communication session associated with a second protocol. For example, a user device (e.g., a client device, a DoH client, a smart device, a mobile device, a content output device, a computing device, a web browser, a search engine, an Internet of things (IoT) device, etc.) attempting a communication session, for example, to access a domain (e.g., an Internet domain, a website, a webpage, etc.) and/or content hosted by a domain, such as "comcast.com," "xfinity.com," and/or the like, may communicate with the network device, based on a first protocol such as DoH and/or the like, to obtain a session token (and/or session identifier (ID)). The network device, based on the nature of the request for the communication session, may determine a time interval, duration, sequence, or period during which the user device may establish and/or re-establish another communication session using the session token. For example, an initial request for a communication session may cause the network device to determine an extended time duration for the session token, and/or the network device may extend or shorten the time duration based on the type of device, or user associated with the device, requesting the communication session. The network device may respond to the user device with the session token and an indication of the time duration. As an example, the network device may respond to the user device with an indication of the time duration and an offer to set the time duration. The time duration may be selected by the user device or set by the user device. The user device may use the session token to establish and/or re-establish another communication session, based on a second protocol, for example, Transport Layer Security (TLS) and/or the like, during the time duration.

This summary is not intended to identify critical or essential features of the disclosure, but merely to summarize certain features and variations thereof. Other details and features will be described in the sections that follow.

BRIEF DESCRIPTION OF THE DRAWINGS

The accompanying drawings, which are incorporated in and constitute a part of this specification, together with the description, serve to explain the principles of the methods and systems:

FIG. 3 shows a flowchart of an example method;

FIG. 8 shows a flowchart of an example method;

FIG. 9 shows a flowchart of an example method;

FIG. 12 shows a flowchart of an example method; and

FIG. 13 shows a flowchart of an example method.

DETAILED DESCRIPTION

Figure 1:
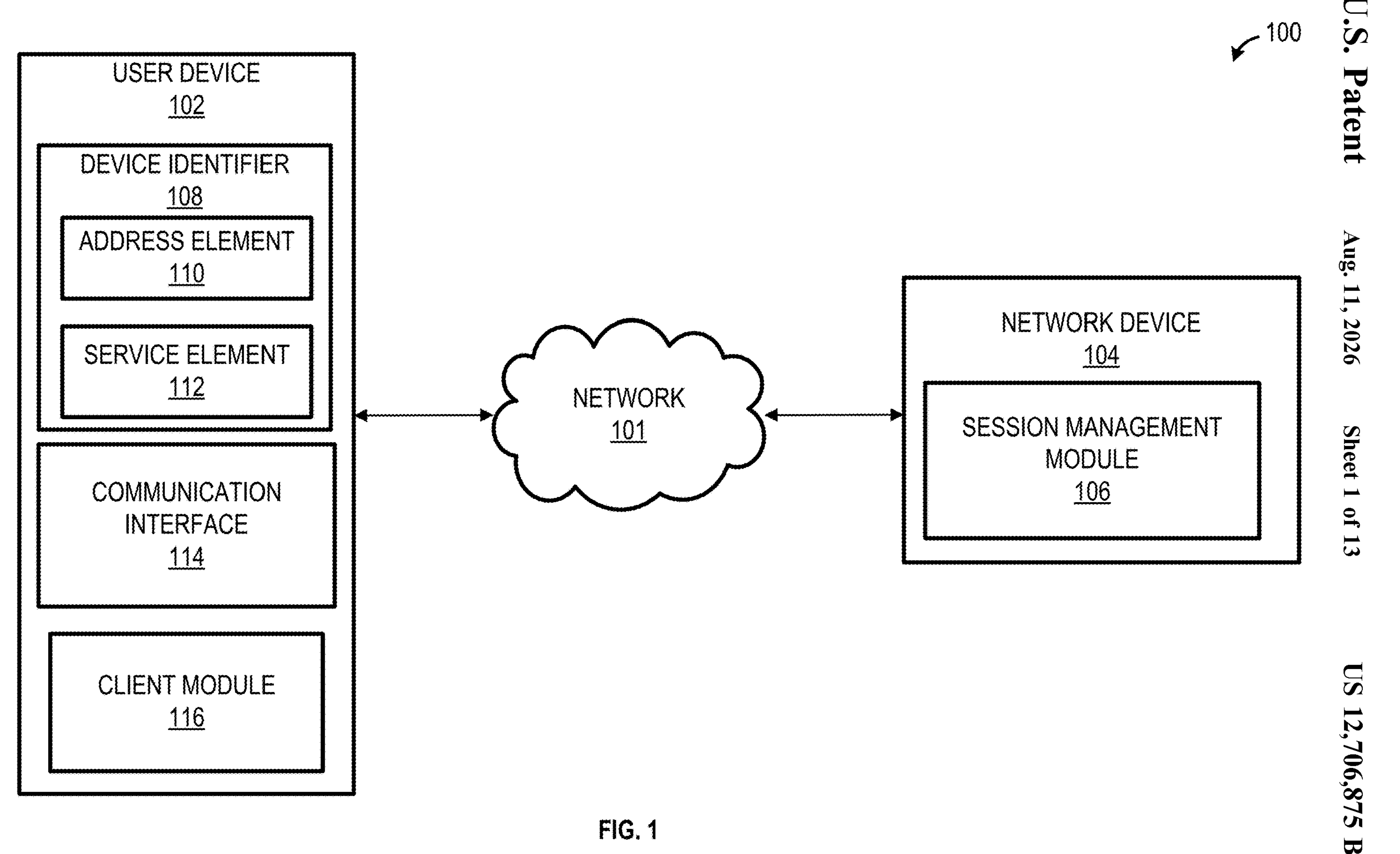
FIG. 1 shows an example system.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. When values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude other components, integers, or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

Throughout this application, reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general-purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Accordingly, blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

"Content items," as the phrase is used herein, may also be referred to as "content," "content data," "content information," "content asset," "multimedia asset data file," or simply "data" or "information". Content items may be any information or data that may be licensed to one or more individuals (or other entities, such as businesses or groups). Content may be electronic representations of video, audio, text, and/or graphics, which may be but is not limited to electronic representations of videos, movies, or other multimedia, which may be but is not limited to data files adhering to MPEG2, MPEG, MPEG4 UHD, HDR, 4k, Adobe® Flash® Video (.FLV) format or some other video file format whether such format is presently known or developed in the future. The content items described herein may be electronic representations of music, spoken words, or other audio, which may be but is not limited to data files adhering to the MPEG-1 Audio Layer 3 (.MP3) format, Adobe®, CableLabs 1.0, 1.1, 3.0, AVC, HEVC, H.264, Nielsen watermarks, V-chip data and Secondary Audio Programs (SAP). Sound Document (.ASND) format or some other format configured to store electronic audio whether such format is presently known or developed in the future. In some cases, content may be data files adhering to the following formats: Portable Document Format (.PDF), Electronic Publication (.EPUB) format created by the International Digital Publishing Forum (IDPF), JPEG (.JPG) format, Portable Network Graphics (.PNG) format, dynamic ad insertion data (.csv), Adobe® Photoshop® (.PSD) format or some other format for electronically storing text, graphics and/or other information whether such format is presently known or developed in the future. Content items may be any combination of the above-described formats.

"Consuming content" or the "consumption of content," as those phrases are used herein, may also be referred to as "accessing" content, "providing" content, "viewing" content, "listening" to content, "rendering" content, or "playing" content, among other things. In some cases, the particular term utilized may be dependent on the context in which it is used. Consuming video may also be referred to as viewing or playing the video. Consuming audio may also be referred to as listening to or playing the audio.

This detailed description may refer to a given entity performing some action. It should be understood that this language may in some cases mean that a system (e.g., a computer) owned and/or controlled by the given entity is actually performing the action.

A user device (e.g., a client device, a DoH client, a smart device, a mobile device, a content output device, a computing device, a web browser, a search engine, an IoT device, etc.) attempting a communication session, for example, to access a domain (e.g., an Internet domain, a website, a webpage, etc.) and/or content hosted by a domain, such as "comcast.com," "xfinity.com," and/or the like, may communicate with a network device (e.g., a server, a domain name system (DNS) server, a DNS over hypertext transfer protocol secure (HTTPS) server (DoH server), a network management device, etc.) to request and/or obtain a session token (and/or a session ID) facilitate a communication session. The user device may request access to the domain, for example, using an encrypted protocol/service such as DoH, and/or the like. A session token may enable the user device to access and/or request access to different portions (e.g., webpages, etc.) and/or content of the domain without continuously needed to undergo an authentication process. The request for access to the domain may include a request to establish a secure/encrypted communication/channel and may indicate a predetermined and/or default time duration, such as a time duration of 300 seconds (e.g., the default time duration for TLS) during which the user device may establish and/or re-establish the communication session using the session token.

The network device may determine a time duration during which the user device may establish and/or re-establish a communication session using the session token. The network device, based on the nature of the request from the user device, may determine a time duration that may be used to modify/update the predetermined and/or default time duration indicated by the request and/or associated with a second request for a communication session. For example, an initial request for a communication session may cause the network device to determine an extended time duration for a corresponding/associated session token, and/or the network device may extend or shorten the time duration based on a type and/or configuration of the user device or based on user credentials of a user of the user device. For example, if the network device receives a request for a DoH communication session, the network device may determine, from a request message header (e.g., HTTP header, etc.) and/or the like, whether the request is from a user device and/or client application that would benefit from a change to the default TLS time interval (e.g., 300 seconds, etc.). The network device may implement a policy to determine, for example, an extended TLS session for a content output device, a set-top-box, and/or a thermostat, and leave the default time duration for a TLS session as is (e.g., unchanged, etc.) for requests from a web browser and/or the like.

The network device may respond to the user device with the session token and an indication of the determined time duration. For example, for a DoH communication session request, the network device may respond and/or send to the user device with an HTTP 302 response code and/or the like that contains a session token and determined time duration for the session token.

The user device may use the session token to establish and/or re-establish another communication session during the time duration determined by the network device or user device. For example, the user device, based on the HTTP 302 response code received from the network device, may close/terminate communications (e.g., an existing DoH session, etc.) with the network device and establish new communication (e.g., a new DoH session, etc.) with the network device. The new communication may be configured with a TLS timeout value that corresponds to the time duration determined by the network device or user device. Use of the time duration determined by the network device or user device may optimize and/or reduce latency associated with communication session requests, for example, communication sessions using DoH protocol, TLS protocol, and/or combinations thereof, and enable the user device to establish and/or re-establish (e.g., re-use, etc.) a communication session, such as if the user device commences and/or restarts the communication session after an idle (e.g., sleep mode, etc.) period and/or the like.

FIG. 1 shows a system 100 for communication session management. Although only certain devices and/or components are shown, the system may include a variety of other devices and/or components that support a wide variety of network and/or communication functions, operations, protocols, content, services, and/or the like. For example, the system 100 may support and/or facilitate a Domain Name System (DNS), Hypertext Transfer Protocol (HTTP), Hypertext Transfer Protocol Secure (HTTPS), DNS over HTTPS (DoH), Transport Layer Security (TLS) protocol, DNS over TLS (DOT), encrypted DNS, and/or the like.

The system 100 enables and or facilitates, for example, communication sessions, such as DNS over HTTPS (DoH) sessions, and enables and/or facilitates a user device (e.g., a client device, a DoH client, a smart device, a mobile device, a content output device, a computing device, a web browser, a search engine, an IoT device, etc.) maintaining extended/longer (or shorter) DoH sessions. A network device (e.g., a server, a domain name system (DNS) server, a DNS over hypertext transfer protocol secure (HTTPS) server (DoH server), a network management device, etc.) may determine, detect, and/or identify the type of user device making the request, and determine whether to offer the user device a longer (or shorter) communication session (e.g., a DoH session, TLS session, a DNS session, etc.).

The system 100 may include a network 101. The network 101 may include a packet-switched network (e.g., an Internet protocol-based network), a non-packet switched network (e.g., quadrature amplitude modulation based network), and/or the like. The network 101 may comprise network adapters, switches, routers, modems, and the like connected through wireless links (e.g., radiofrequency, satellite, etc.) and/or physical links (e.g., fiber optic cable, coaxial cable, Ethernet cable, or a combination thereof). The network 101 may comprise public networks, private networks, wide area networks (e.g., Internet), local area networks, and/or the like. The network 101 may comprise a content access network, content distribution network, and/or the like. The network 101 may be configured to provide communication from telephone, cellular, modem, and/or other electronic devices to and throughout the system 100. The network 101 and/or devices in communication and/or associated with the network 101 may provide, facilitate, and/or support one or more services, applications, and/or protocols, such as a Domain Name System (DNS), Hypertext Transfer Protocol (HTTP), Hypertext Transfer Protocol Secure (HTTPS), DNS over HTTPS (DoH), Transport Layer Security (TLS) protocol, DNS over TLS (DOT), encrypted DNS, and/or the like. The network 101 may be configured to be in communication with one or more of a user device 102, a network device 104, and/or any other device/component. The user device 102 may desire to reach servers and other networked information associated with a domain name according to an IP address. The IP address may be provided by a domain name server (e.g., network device 104). The target devices and networks requested by user device 102 may be through the network device 104 or the network 101.

The user device 102 (e.g., a client device, a DoH client, a smart device, a mobile device, a content output device, a computing device, a web browser, a search engine, IoT device, etc.) may be associated with a user identifier or device identifier 108. The device identifier 108 may be any identifier, token, character, string, or the like, for differentiating one user and/or user device (e.g., user device 102) from another user or user device. The device identifier 108 may identify a user or user device as belonging to a particular class of users or user devices. The device identifier 108 may comprise information relating to the user device such as a manufacturer, a model or type of device, a service provider associated with the user device 102, a state of the user device 102, a locator, a label, and/or classifier. Other information may be represented by the device identifier 108.

The device identifier 108 may comprise an address element 110 and a service element 112. The address element 110 may comprise a network address (e.g., an IP address, etc.), a media access control (MAC) address, or the like. The address element 110 may be used to establish a communication session between the user device 102, the network device 104, other devices and/or components of the system 100, and/or the like. The address element 110 may be used as an identifier and/or locator of the user device 102. The address element 110 may be persistent for a particular network.

The service element 112 may comprise an identification of a service provider associated with the user device 102 and/or with the class of user device 102. The class of the user device 102 may be related to a type of device, a device capability, type of service being provided, and/or a level of service (e.g., business class, service tier, service package, etc.). The service element 112 may comprise information associated with a communication service provider (e.g., Internet service provider) that is providing or enabling data flow such as communication services to the user device 102. The service element 112 may comprise information relating to a preferred service provider for one or more particular services relating to the user device 102. The address element 110 may be used to identify or retrieve data from the service element 112, or vice versa. The address element 110 and/or the service element 112 may be stored remotely from the user device 102 and retrieved by one or more devices such as the user device 102, and/or the network device 104. Other information may be represented by the service element 112.

The user device 102 may include and/or be associated with a communication interface 114. The communication interface 114 may enable a user to interact with the user device 102, the network device 104, and/or any other device/component of the system 100. The communication interface 114 may include and/or be associated with software, hardware, and/or interfaces that may be used to provide communication between a user and one or more of the user device 102, the network device 104, and/or any other device/component of the system 100. The communication interface 114 may be used to request or query various files from a local source and/or a remote source, such as the network device 104, and/or the like.

The user device 102 may include a client module 116. The client module 116 may be an application, such as a web application, a user-agent based application (e.g., a single-page (browser-based) application), a native application, a DNS client engine, a mobile application, and or the like that is implemented/run on and/or associated with the user device 102. The client module 116 may support and/or facilitate one or more services, applications, and/or protocols, such as a Domain Name System (DNS), Hypertext Transfer Protocol (HTTP), Hypertext Transfer Protocol Secure (HTTPS), DNS over HTTPS (DoH), Transport Layer Security (TLS) protocol, DNS over TLS (DOT), encrypted DNS, and/or the like. The user device 102 may, for example, via the client module 116, request a communication session. The user device 102 may, for example, request a communication session with the network device 104 (e.g., a server, a domain name system (DNS) server, a DNS over hypertext transfer protocol secure (HTTPS) server (DoH server), a network management device, etc.). A request for a communication session may be, for example, a request for a DoH communication session and/or the like.

A request for a communication session may be received, for example, as part of an authentication and/or handshake process (e.g., a TLS handshake, etc.) and/or after a successful authentication and/or handshake process (e.g., as part of a DoH request, etc.). For example, the network device 104 may receive a request for a communication session as part of an authentication and/or handshake process with the user device 102 and/or after a successful authentication and/or handshake process with the user device 102. For example, a request for a communication session may include and/or be a DoH request (e.g. an HTTP GET request, an HTTP POST request, etc.).

A corresponding session token (and/or a session ID) for a request for a communication session may be determined, for example, by the network device 104. The network device 104 may include a session management module 106. The network device 104 may receive a request for a communication session and use the session management module 106 to determine and/or generate a corresponding session token (and/or a session ID). A session token (and/or a session ID) may be determined/generated through a random unique string generating process, a hashing algorithm, and/or any other method/means. A session token (and/or a session ID) may be stored, for example, by the network device 104, in a local and/or remote storage with associated information, such as a device identifier (e.g., a device identifier 108, etc.), user/client identifier, a time duration (e.g., a time-to-live (TTL) value, etc.), a device profile, and/or the like. A session token (and/or a session ID) may be encrypted and/or decrypted in accordance with the protocols (e.g., DoH protocol, TLS protocol, etc.) associated with the system 100.

A time duration associated with a request for a communication session may be determined, for example, by the network device 104. The network device 104, based on the nature of a request for a communication session, may determine and/or update a predetermined and/or default time duration and/or determine a time duration during which the user device may establish and/or re-establish the communication session using a session token. For example, if a request for a communication session is and/or includes a DoH request, the network device 104 may determine if a default time duration associated with the request should be modified, updated, changed, and/or the like.

An initial request for a communication session may cause the network device 104 to determine an extended time duration for a session token, and/or the network device 104 may extend or shorten a time duration based on a type of user device (e.g., the user device 102, etc.), an application requesting the communication session, user credentials associated with a user of the user device, and/or combinations of the user device, the application, and the user credentials. For example, if a request for a communication session is and/or includes a DoH request, the network device 104 may determine, from a request message header (e.g., HTTP header, etc.) and/or the like, whether the request is from a user device (e.g., the user device 102, etc.) and/or application that should receive a session token associated with a time-interval that has been modified, updated, changed, and/or the like from a default value, or if the default time duration (e.g., default TLS time duration of 300 seconds, etc.) value should remain as indicated by the request for the communication session.

The network device 104 may, for example, implement a policy to determine an extended DoH session and/or TLS session time duration for any device and/or application that may transition from an active state to an idle state (e.g., sleep mode, etc.) during a communication session and/or a default time duration associated with a session token (and/or a session ID), such as a content output device, a set-top-box, a thermostat, and/or the like. The network device 104 may, for example, implement a policy to determine an extended or shortened DoH session and/or TLS session time duration based on any indication of a device type, a device configuration, and/or a device location. The network device 104 may, for example, implement a policy to use a default DoH session and/or TLS session time duration based on the nature of the request for the communication session, such as requests from web browsers, requests originating from a particular domain and/or region, and/or the like.

The network device 104 may respond to a request from a communication session from the user device 102 with a session token (and/or a session ID) and an indication of a determined time duration for the session token. The session token may be, for example, encrypted and embedded within a response to the user device 102 according to the protocol of the system 100, such as a DoH protocol, TLS protocol, and/or the like. For example, for a DoH communication session request, the network device 104 may respond with and/or send to the user device 102 an HTTP 302 response code and/or the like that contains a session token and determined time duration for the session token.

The user device 102 may receive the session token and an indication of the determined time duration for the session token. For example, the user device 102 may receive an HTTP 302 response code and/or the like that contains a session token and determined time duration for the session token. The user device 102 may use the session token to establish and/or re-establish a communication session during the time duration determined by the network device or user device. For example, the user device 102, based on the HTTP 302 response code received from the network device 104, may close/terminate communications (e.g., an existing DoH session, an existing TLS session, etc.) with the network device and establish new communication (e.g., a new DoH session, a new TLS session, etc.) with the network device 104.

The new communication may be configured with a time duration, such as a TLS timeout value, that corresponds to the time duration determined by the network device 104 or user device 102. Use of the time duration determined by the network device 104 or user device 102 may optimize and/or reduce latency associated with communication session requests, for example, communication sessions using DoH protocol and/or the like. Use of the time duration determined by the network device 104 or user device 102 may enable the user device 102 to establish and/or re-establish (e.g., re-use, etc.) the communication session. For example, the user device 102 may commence and/or re-establish a communication session after an idle (e.g., sleep mode, etc.) period and/or the like that occurs during a time duration determined by the network device 104 or user device 102.

Figure 2:
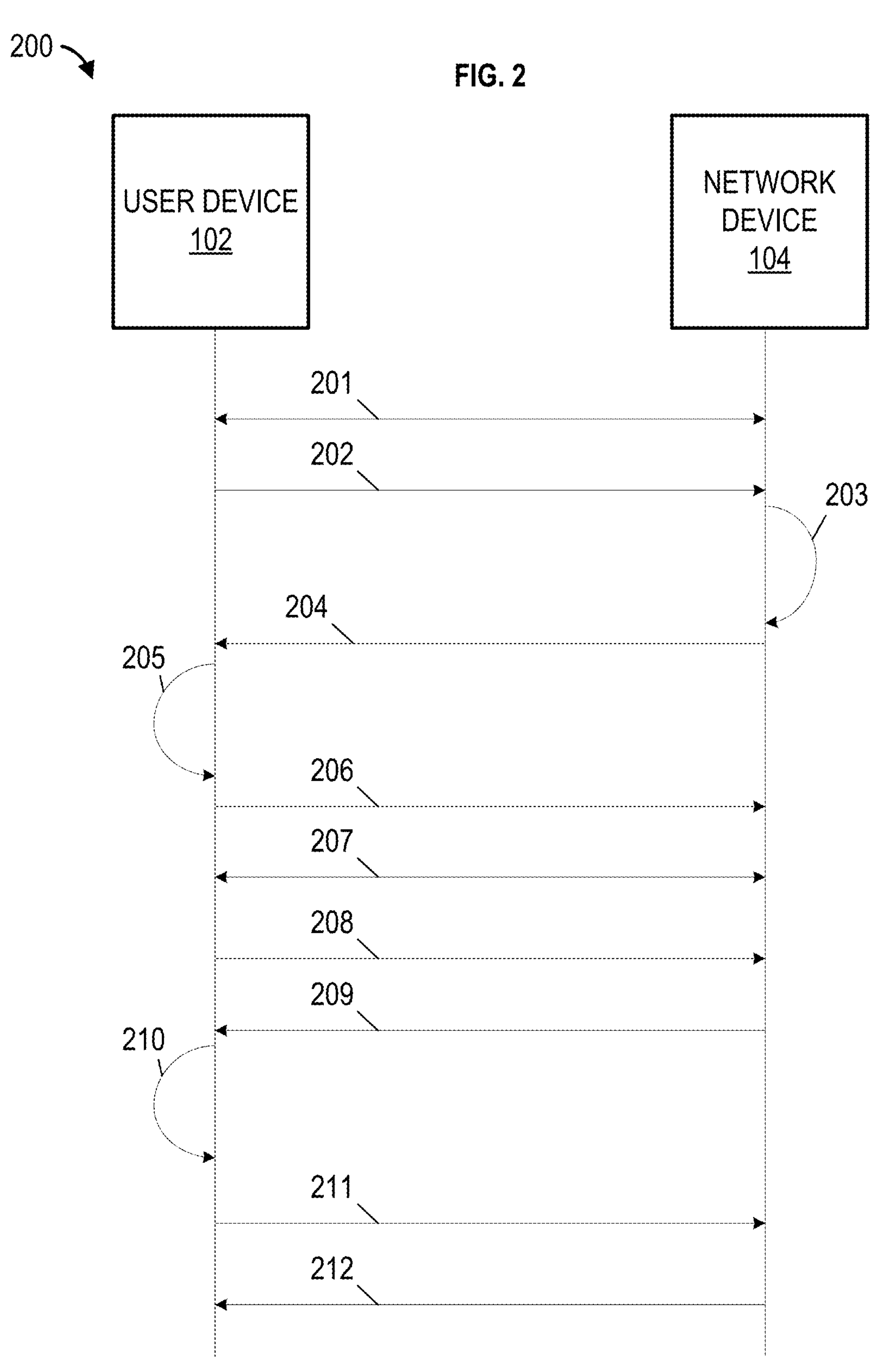
FIG. 2 shows an example communication diagram.

FIG. 2 shows an example communication diagram 200 for communication session management. The communication diagram 200 shows example communications between the user device 102 and the network device 104 implementing DoH service.

The user device 102, in an attempt to reach and/or access a resource (e.g., a webpage, a file, content, a content item, etc.) and/or service (e.g., web service, etc.), may communicate with the network device 104. For example, the user device 102 may attempt to reach and/or access the domain name "www.xfinity.net" (e.g., a website, etc.).

At 201, the user device 102 and the network device 104 may participate and/or engage in introductory communications. For example, the user device 102 and the network device 104 may execute a session management handshake, such as a TLS handshake (or any other encrypted DNS handshake). The TLS handshake may be associated with a default timeout value and/or time duration, such as 300 seconds.

At 202, the user device 102 may send a request for a communication session, such as a DoH communication session, to the network device 104. For example, the user device 102 may send a DoH Request and/or a DNS record query to the network device 104. For example, the user device 102 may send HTTP GET/POST request associated with the domain name "www.xfinity.net."

At 203, the network device 104 may receive the request for the communication session. For a DoH request, the network device 104 may determine whether the request is from a user device, which may include an IoT, sensory, and/or monitoring device that transmits data periodically to a data collecting application (e.g., the user device 102, etc.) and/or application that should receive a session token associated with a time duration that is different, modified, and/or the like from a default value, such as the default timeout value and/or time duration indicated by the TLS handshake. For example, an initial request for a communication session may cause the network device 104 to determine a time duration that is different, modified, and/or the like from the default timeout value and/or time duration indicated by the TLS handshake, such as an extended time duration for a session token or a shortened time duration for the session token. The network device 104 may extend or shorten a time duration based on a type of user device (e.g., the user device 102, etc.), type of user associated with the device, and/or application requesting the communication session.

The network device 104 may store an indication of a mapping and/or association between a session token (and/or a session ID) (and corresponding time duration) determined by the network device 104 or user device 102 and any session token (and/or a session ID) used and/or determined during the TLS handshake, for example, by the network device 104 and/or the user device 102.

At 204, the network device 104 may respond to the user device 102. The response may be, for example, a DoH response. The response may include the session token (e.g., a DoH session token, etc.) and an indication of the time duration determined by the network device 104 or user device 102. As another example, the response may define the session token (e.g., a DoH session token) and a prompt for selection or input of the time duration. The response may be configured to cause the user device 102 to send another request for a communication session. For example, a DoH response may include an HTTP response status code 302.

At 205, the user device 102 may receive the session token (e.g., DoH session token, etc.) and select or input the time duration or accept the received indication of the determined time duration for the session token. For example, the user device 102 may receive an HTTP response status code 302 and/or the like that includes and/or is associated with the session token and an indication of the determined time duration for the session token. As another example, the user device 102 may receive an HTTP response status code 302 and/or the like that includes and/or is associated with the session token and a prompt for providing selection or input of the time duration for the session token. The user device may store, for example, in a local cache and/or remote storage, the session token received from the network device 104.

At 206, the user device 102, based on the HTTP 302 response code received from the network device 104, may close/terminate communications (e.g., the existing TLS session, etc.) with the network device 104 to establish a new communication.

At 207, the user device 102 and the network device 104 may establish new communication (e.g., a new DoH session, a new TLS session, etc.). The user device 102 and the network device 104 may participate and/or engage in introductory communications. For example, the user device 102 and the network device 104 may execute another TLS handshake (or any other encrypted DNS handshake). The TLS handshake may use a TLS timeout value associated with and/or corresponding to the time duration determined by the network device 104 or user device 102. The TLS session may remain active for a duration corresponding to the time duration determined by the network device 104 or user device 102. Use of the time duration determined by the network device 104 or user device 102 may optimize and/or reduce latency associated with communication session requests, for example, communication sessions using DoH protocol and/or the like. Use of the time duration determined by the network device 104 or user device 102 may enable the user device 102 to establish and/or re-establish (e.g., re-use, etc.) connection with the network device 104 without the need to undergo a handshake (e.g., TLS handshake, etc.) and/or authentication process for the duration of the time duration determined by the network device 104 or user device 102.

At 208, the user device 102 may send a request for a communication session, such as a DoH communication session, to the network device 104. For example, the user device 102 may send a DoH Request and/or a DNS record query to the network device 104. For example, the user device 102 may send HTTP GET/POST requests associated with a domain name, such as "www.xfinity.net."

At 209, the network device 104 may respond to the user device 102. The response may be, for example, a DoH response. The response may include a network address or a set of network addresses that corresponds to a domain name, for example, "www.xfinity.net." The network device 104 may determine the network address, for example, via a lookup table and/or the like. The network device 104 may determine the network address based on any domain name resolution technique and/or method.

At 210, the user device 102 may transition from an active state to an idle state (e.g., sleep mode, etc.).

At 211, the user device 102 may transition from an idle state (e.g., sleep mode, etc.) to an active state. In the active state, the user device 102 may commence and/or re-establish a communication session (e.g., the TLS communication session) during the time duration determined by the network device 104 or user device 102. The user device 102 may send a request for a communication session, such as a DoH communication session, to the network device 104. For example, the user device 102 may send a DoH Request and/or a DNS record query to the network device 104. For example, the user device 102 may send HTTP GET/POST requests associated with the same domain name ("www.xfinity.net") or a different domain name, such as "nbc.com." The user device 102 may establish and/or re-establish (e.g., re-use, etc.) connection with the network device 104 during the time duration determined by the network device 104 or user device 102 without undergoing another handshake (e.g., TLS handshake, etc.) and/or authentication process. The request for the communication session may be sent using the same TLS socket as previously used, for example, in steps 201-202 and/or the like.

At 212, the network device 104 may respond to the user device 102. The response may be, for example, a DoH response. The response may include a network address or a set of addresses that corresponds to a domain name, for example, "www.nbc.com." The network device 104 may determine the network address, for example, via a lookup table and/or the like. The network device 104 may determine the network address based on any domain name resolution technique and/or method.

FIG. 3 shows a flowchart of a method 300 for communication session management. A user device (e.g., a client device, a DoH client, a smart device, a mobile device, a content output device, a computing device, a web browser, a search engine, the user device 102, etc.) may receive and/or engage/participate in extended/longer (or shorter) duration communication sessions than, for example, default Domain Name System over Hypertext Transfer Protocol Secure (DoH) communication sessions and/or Transport Layer Security (TLS) communication sessions. For example, a user device may receive and/or engage/participate in extended/longer (or shorter) duration communication sessions such as default Domain Name System over Hypertext Transfer Protocol Secure (DoH) communication sessions and/or Transport Layer Security (TLS) communication sessions based on a time duration value determined by a network device (e.g., a server, a domain name system (DNS) server, a DNS over hypertext transfer protocol secure (HTTPS) server (DoH server), a network management device, the network device 104, etc.). Use of the time duration determined by the network device may optimize and/or reduce latency associated with communication session requests, for example, communication sessions using DoH protocol, TLS protocol, and/or the like, and enable the user device to establish and/or re-establish (e.g., re-use, etc.) a communication session, such as if the user device establishes and/or re-establishes the communication session after an idle (e.g., sleep mode, etc.) period and/or the like.

At 310, session information and a time duration may be determined. A network device (e.g., a server, a domain name system (DNS) server, a DNS over hypertext transfer protocol secure (HTTPS) server (DoH server), a network management device, the network device 104, etc.) may determine session information and a time duration associated with the session information based on a request for a first communication session. The request for the first communication session may be received from a user device (e.g., a client device, a DoH client, a smart device, a mobile device, a content output device, a computing device, a web browser, a search engine, the user device 102, etc.). The first communication session may be, for example, based on DoH protocol (e.g., a DoH session, etc.).

The session information may include a session token, a session identifier (ID), and/or the like. The session information may be determined/generated based on a random unique string generating process, a hashing algorithm, and/or any other method/means.

Determining the time duration may include determining that the request for the first communication session is an initial request for the first communication session. The network device may determine, based on the request for the first communication session being the initial request for a communication session (e.g., a DoH session, etc.) or the device location (e.g., from the same network administrative domain), or the combination of both, the time duration.

The request for the first communication session may indicate, for example, within a message header and/or any other portion of the request, a device type of the user device, such as whether the user device is a content output device, a set-top-box, a thermostat, a web browser, an application, and/or the like. The network device may determine the time duration based on the device type. The request for the first communication session may indicate, for example, within a message header and/or any other portion of the request, a location of the user device, such as whether the user device is within a certain domain, service area, region, and/or the like. The network device may determine the time duration based on the location of the user device (and/or the device type).

At 320, a response to the request for the first communication session may be sent. The network device may send a response to the request for the first communication session. The response may be configured to cause the user device to request a second communication session. For example, the response to the request for the first communication session may include a DoH 302 response. The DoH 302 response may cause the user device to close/terminate the first communication session and request the second communication session. The response to the request for the first communication session may include the session information and an indication of the time duration.

At 330, the request for the second communication session may be received. The network device may receive the request for the second communication session from the user device. The request for the second communication session may include the indication of the time duration and the session information. For example, the request for the second communication session may be based on Transport Layer Security (TLS) protocol and include the indication of the time duration as a TLS timeout value.

At 340, the second communication session may be established. The network device may establish the second communication session based on the session information. The duration (e.g., current duration, available duration, etc.) of the second communication session may correspond to the time duration determined by the network device. Establishing the second communication session may include determining that the time duration is active and that the session information is valid. The network device may establish the second communication session based on the valid session information and the active time duration.

Figure 4:
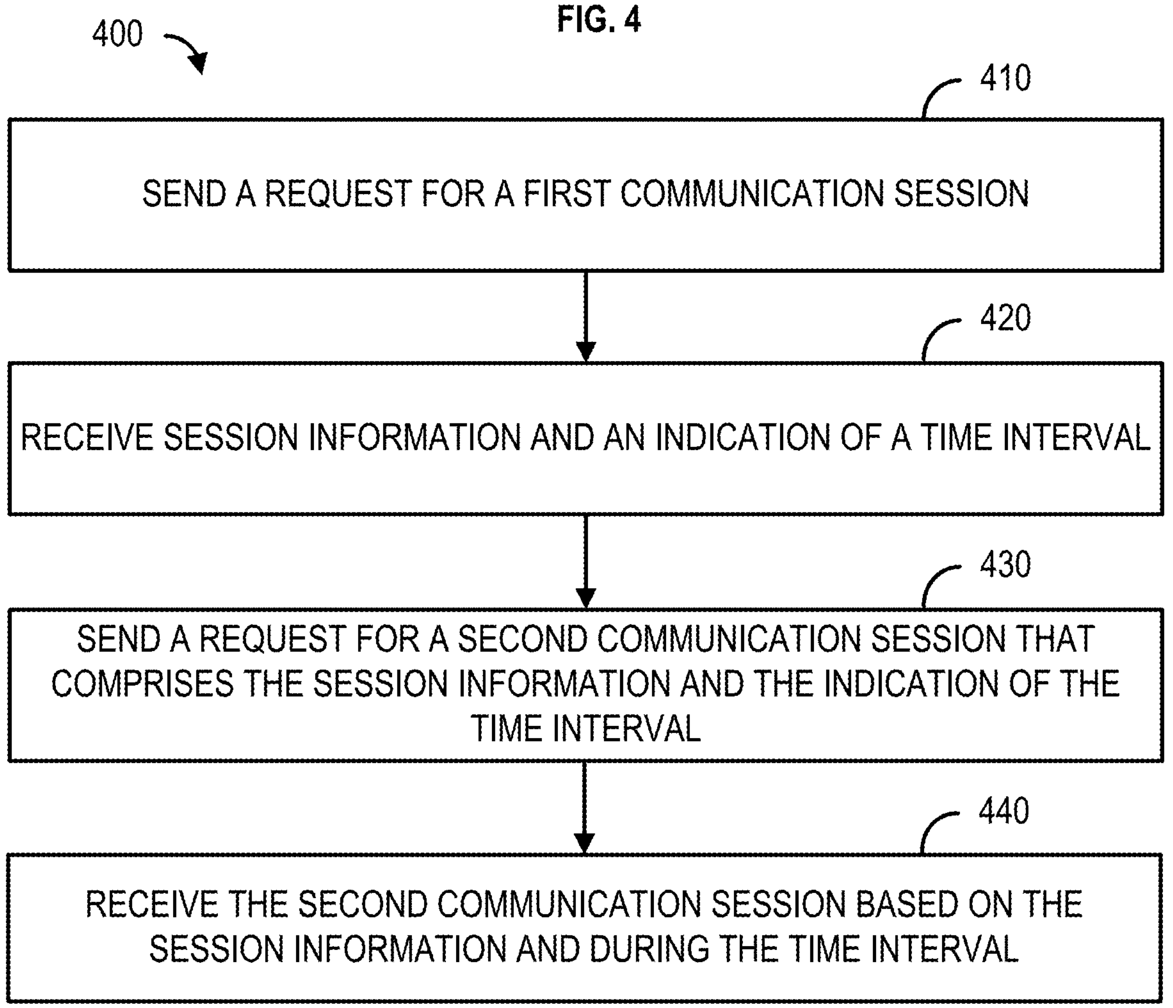
FIG. 4 shows a flowchart of an example method.

FIG. 4 shows a flowchart of a method 400 for communication session management. A user device (e.g., a client device, a DoH client, a smart device, a mobile device, a content output device, a computing device, a web browser, a search engine, the user device 102, etc.) may receive and/or engage/participate in extended/longer (or shorter) duration communication sessions than, for example, default Domain Name System over Hypertext Transfer Protocol Secure (DoH) communication sessions and/or Transport Layer Security (TLS) communication sessions. For example, a user device may receive and/or engage/participate in extended/longer (or shorter) duration communication sessions such as default Domain Name System over Hypertext Transfer Protocol Secure (DoH) communication sessions and/or Transport Layer Security (TLS) communication sessions based on a time duration value determined by a network device (e.g., a server, a domain name system (DNS) server, a DNS over hypertext transfer protocol secure (HTTPS) server (DoH server), a network management device, the network device 104, etc.). Use of the time duration determined by the network device may optimize and/or reduce latency associated with communication session requests, for example, communication sessions using DoH protocol, TLS protocol, and/or the like, and enable the user device to establish and/or re-establish (e.g., re-use, etc.) a communication session, such as if the user device establishes and/or re-establishes the communication session after an idle (e.g., sleep mode, etc.) period and/or the like.

At 410, a request for a first communication session may be sent. A user device (e.g., a client device, a DoH client, a smart device, a mobile device, a content output device, a computing device, a web browser, a search engine, the user device 102, etc.) may send the request for the first communication session to a network device (e.g., a server, a domain name system (DNS) server, a DNS over hypertext transfer protocol secure (HTTPS) server (DoH server), a network management device, the network device 104, etc.). The first communication session may be, for example, based on DoH protocol (e.g., a DoH session, etc.). The request for the first communication session may include a DoH request (e.g. an HTTP GET request, an HTTP POST request, etc.).

At 420, session information and an indication of a time duration may be received. The user device may receive the session information and the indication of the time duration from the network device based on the request for the first communication session. The session information may include a session token, a session identifier (ID), and/or the like.

The session information may be determined/generated by the network device based on a random unique string generating process, a hashing algorithm, and/or any other method/means. The network device may determine the time duration based on the first communication session being, for example, an initial request for a communication session from the user device. The network device may determine, based on the request for the first communication session being the initial request for a communication session (e.g., a DoH session, etc.), the time duration.

The request for the first communication session may indicate, for example, within a message header and/or any other portion of the request, a device type of the user device, such as whether the user device is a content output device, a set-top-box, a thermostat, a web browser, an application, and/or the like. The network device may determine, for example, the time duration based on the device type. The request for the first communication session may indicate, for example, within a message header and/or any other portion of the request, a location of the user device, such as whether the user device is within a certain domain, service area, region, and/or the like. The network device may determine the time duration based on the location of the user device (and/or the device type).

The network device may determine, for example, the time duration based on the device type and/or location. A response to the request for the first communication session may be configured to cause the user device to request a second communication session. For example, receiving the session information and the indication of the time duration may include receiving a DoH 302 response comprising the session information and the indication of the time duration. The DoH 302 response may cause the user device to close/terminate the first communication session and request the second communication session.

At 430, a request for a second communication session may be sent. The user device may send the request for the second communication session. The request for the second communication session may include the indication of the time duration and the session information. For example, the request for the second communication session may be based on Transport Layer Security (TLS) protocol and include the indication of the time duration as a TLS timeout value.

At 440, the second communication session may be received. The user device may receive the second communication session based on the session information. The duration (e.g., current duration, available duration, etc.) of the second communication session may correspond to the time duration determined by the network device. The network device may determine that the time duration is active and that the session information is valid. The network device may, for example, establish the second communication session based on the valid session information and the active time duration.

Figure 5:
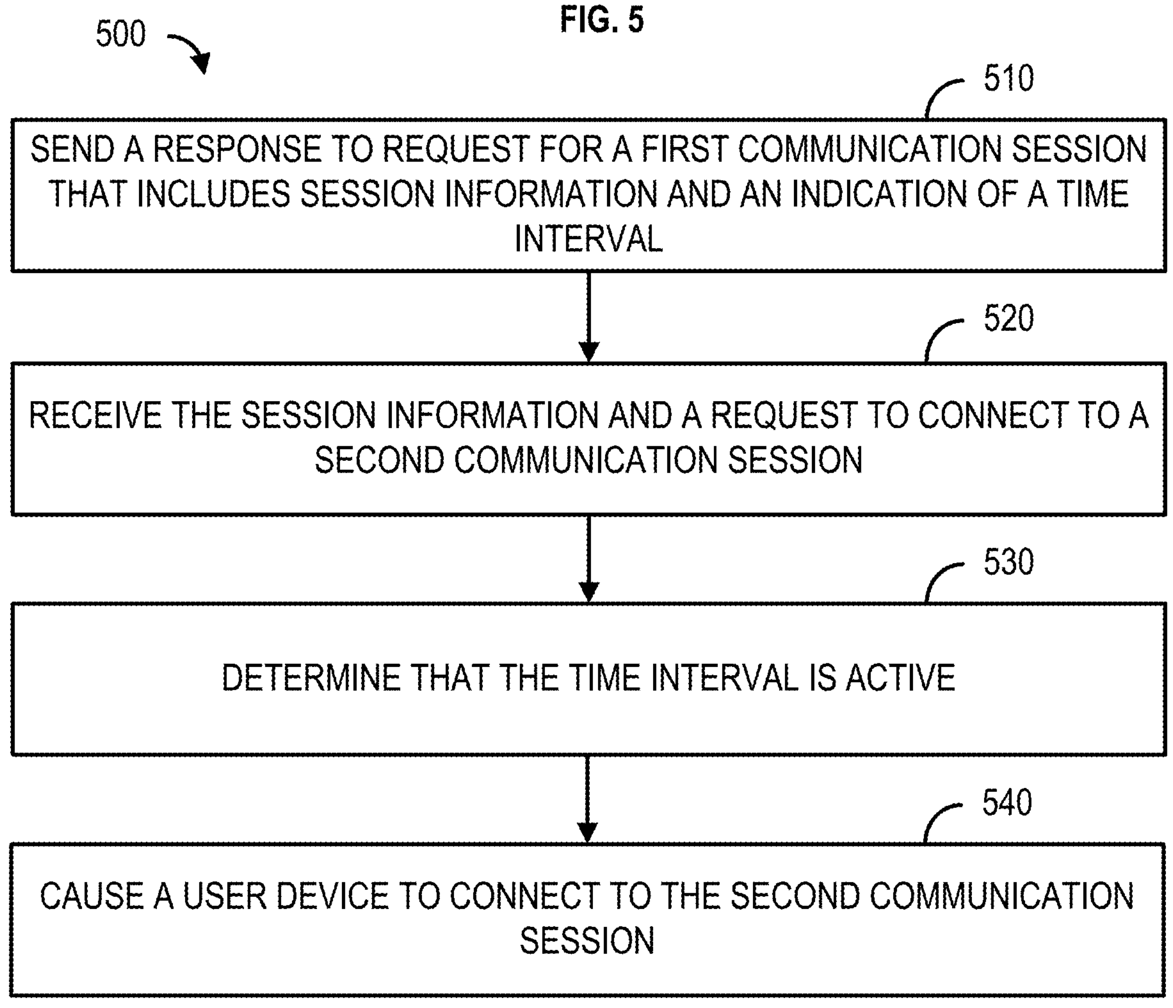
FIG. 5 shows a flowchart of an example method.

FIG. 5 shows a flowchart of a method 500 for communication session management. A user device (e.g., a client device, a DoH client, a smart device, a mobile device, a content output device, a computing device, a web browser, a search engine, the user device 102, etc.) may receive and/or engage/participate in extended/longer (or shorter) duration communication sessions than, for example, default Domain Name System over Hypertext Transfer Protocol Secure (DoH) communication sessions and/or Transport Layer Security (TLS) communication sessions. For example, a user device may receive and/or engage/participate in extended/longer (or shorter) duration communication sessions such as default Domain Name System over Hypertext Transfer Protocol Secure (DoH) communication sessions and/or Transport Layer Security (TLS) communication sessions based on a time duration value determined by a network device (e.g., a server, a domain name system (DNS) server, a DNS over hypertext transfer protocol secure (HTTPS) server (DoH server), a network management device, the network device 104, etc.). Use of the time duration determined by the network device may optimize and/or reduce latency associated with communication session requests, for example, communication sessions using DoH protocol, TLS protocol, and/or the like, and enable the user device to establish and/or re-establish (e.g., re-use, etc.) a communication session, such as if the user device establishes and/or re-establishes the communication session after an idle (e.g., sleep mode, etc.) period and/or the like.

At 510, a response to a request for a first communication session may be sent. A network device (e.g., a server, a domain name system (DNS) server, a DNS over hypertext transfer protocol secure (HTTPS) server (DoH server), a network management device, the network device 104, etc.) may send a response to a user device (e.g., a client device, a DoH client, a smart device, a mobile device, a content output device, a computing device, a web browser, a search engine, the user device 102, etc.) that requests a first communication session. The first communication session may be, for example, based on DoH protocol (e.g., a DoH session, etc.). The response may include session information and a time duration associated with the session information.

The network device may determine the session information and the time duration associated with the session information based on the request for the first communication session. The session information may include a session token, a session identifier (ID), and/or the like. The session information may be determined/generated based on a random unique string generating process, a hashing algorithm, and/or any other method/means. Determining the time duration may include determining that the request for the first communication session is an initial request for the first communication session. The network device may determine, based on the request for the first communication session being the initial request for a communication session (e.g., a DoH session, etc.), the time duration.

The request for the first communication session may indicate, for example, within a message header and/or any other portion of the request, a device type of the user device, such as whether the user device is a content output device, a set-top-box, a thermostat, a web browser, an application, and/or the like. The network device may determine the time duration based on the device type. The request for the first communication session may indicate, for example, within a message header and/or any other portion of the request, a location of the user device, such as whether the user device is within a certain domain, service area, region, and/or the like. The network device may determine the time duration based on the location of the user device (and/or the device type).

The response to the request for the first communication session may be configured to cause the user device to request a second communication session. For example, the response to the request for the first communication session may include a DoH 302 response. The DoH 302 response may cause the user device to close/terminate the first communication session and request the second communication session. The response to the request for the first communication session may include the session information and an indication of the time duration.

At 520, a request to connect to the second communication session may be received. The network device may receive a request to connect to the second communication session from the user device. The user device may send the request to connect to the second communication session, for example, based on the user device transitioning from an idle state (e.g., sleep mode, etc.) to an active state. For example, the user device may transition to an idle state at some time during the duration of the time duration.

For example, the user device may send a request for the second communication session. The request for the second communication session may include the indication of the time duration and the session information. For example, the request for the second communication session may be based on Transport Layer Security (TLS) protocol and include the indication of the time duration as a TLS timeout value. The user device may receive the second communication session based on the session information. The duration (e.g., current duration, available duration, etc.) of the second communication session may correspond to the time duration determined by the network device. The network device may determine that the time duration is active and that the session information is valid. The network device may, for example, establish the second communication session based on the valid session information and the active time duration.

The user device may transition from an active state, for example, while receiving the second communication session, to an idle state (e.g., sleep mode, etc.). The user device may send the request to connect to the second communication session based on the user device transitioning from the idle state (e.g., sleep mode, etc.) to the active state. The user device may send the request to connect (e.g., reconnect, etc.) to the second communication session. The request to the request to connect (e.g., reconnect, etc.) to the second communication session may include the session information.

At 530, the time duration associated with the session information may be determined to be active. The network device may determine that the time duration associated with the session information is active. The network device may determine that the time duration is active and that the session information is valid.

At 540, the user device may connect to the second communication session. The network device may cause the user device to connect to the second communication session based on the session information and the active time duration. The network device may determine that the time duration is active and that the session information is valid. The network device may, for example, establish the second communication session, based on the valid session information and the active time duration, to enable the user device to connect to the second communication session.

Figure 6:
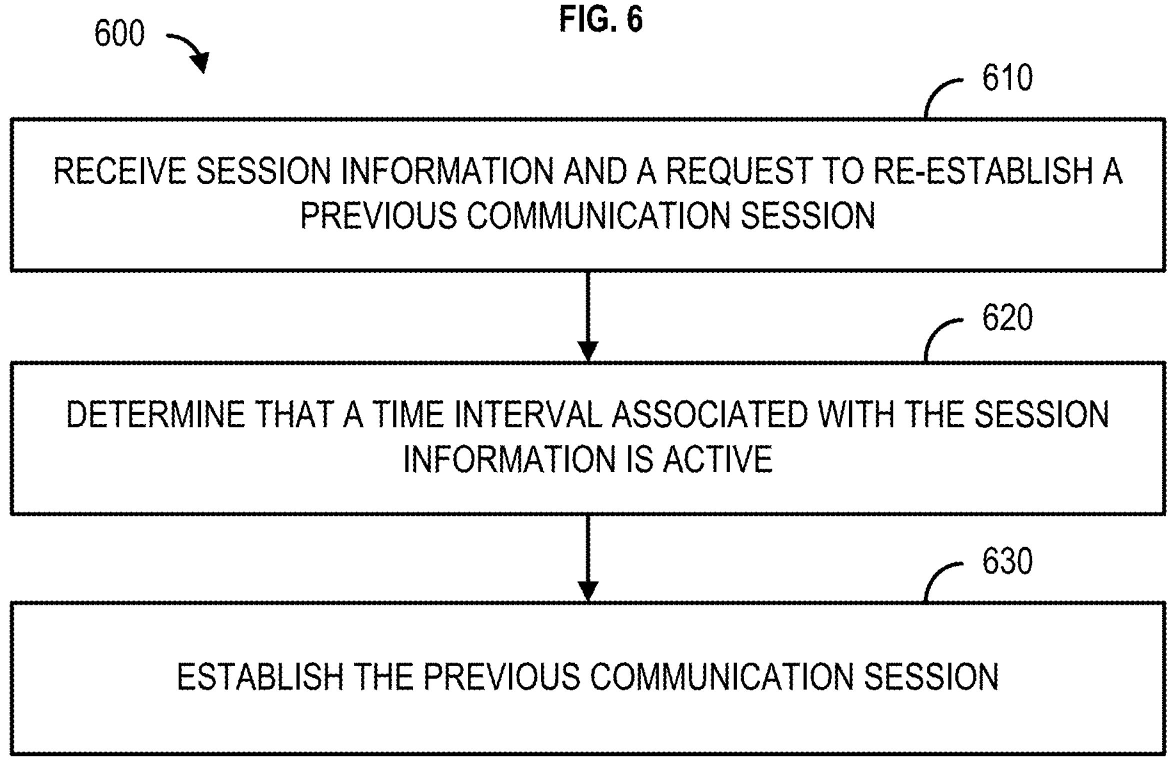
FIG. 6 shows a flowchart of an example method.

FIG. 6 shows a flowchart of a method 600 for communication session management. A user device (e.g., a client device, a DoH client, a smart device, a mobile device, a content output device, a computing device, a web browser, a search engine, the user device 102, etc.) may receive and/or engage/participate in extended/longer (or shorter) duration communication sessions than, for example, default Domain Name System over Hypertext Transfer Protocol Secure (DoH) communication sessions and/or Transport Layer Security (TLS) communication sessions. For example, a user device may receive and/or engage/participate in extended/longer (or shorter) duration communication sessions such as default Domain Name System over Hypertext Transfer Protocol Secure (DoH) communication sessions and/or Transport Layer Security (TLS) communication sessions based on a time duration value determined by a network device (e.g., a server, a domain name system (DNS) server, a DNS over hypertext transfer protocol secure (HTTPS) server (DoH server), a network management device, the network device 104, etc.). Use of the time duration determined by the network device may optimize and/or reduce latency associated with communication session requests, for example, communication sessions using DoH protocol, TLS protocol, and/or the like, and enable the user device to establish and/or re-establish (e.g., re-use, etc.) a communication session, such as if the user device establishes and/or re-establishes the communication session after an idle (e.g., sleep mode, etc.) period and/or the like.

At 610, a request for a previous communication session may be received. A network device (e.g., a server, a domain name system (DNS) server, a DNS over hypertext transfer protocol secure (HTTPS) server (DoH server), a network management device, the network device 104, etc.) may receive a request for a previous communication session. The request for the previous communication session may be received from a user device (e.g., a client device, a DoH client, a smart device, a mobile device, a content output device, a computing device, a web browser, a search engine, the user device 102, etc.). The request for the previous communication session may include session information.

For example, the user device may send the request for the previous communication session based on the user device transitioning from an idle state (e.g., sleep mode, etc.) to an active state. For example, the user device may transition to an idle state at some time during the duration of a time duration that is associated with the session information and determined by the network device.

For example, the network device may determine the session information and the time duration associated with the session information based on a request for an initial communication session received from the user device. The initial communication session may be, for example, based on DoH protocol (e.g., a DoH session, etc.). The session information may include a session token, a session identifier (ID), and/or the like. The session information may be determined/generated, for example, by the network device, based on a random unique string generating process, a hashing algorithm, and/or any other method/means. The network device may determine the time duration based on the request for the initial communication session. The request for the initial communication session may indicate, for example, within a message header and/or any other portion of the request, a device type of the user device, such as whether the user device is a content output device, a set-top-box, a thermostat, a web browser, an application, and/or the like. The initial communication session may indicate, for example, within a message header and/or any other portion of the request, a location of the user device, such as whether the user device is within a certain domain, service area, region, and/or the like.

The network device may determine the time duration based on the device type and/or the device location. The network device may send the session information and an indication of the time duration to the user device with a response to the request for the initial communication session. The response may be configured to cause the user device to request another communication session, such as the previous communication session. For example, the response to the request for the initial communication session may include a DoH 302 response. The DoH 302 response may cause the user device to close/terminate the initial communication session and request another communication session, such as the previous communication session.

The user device may send a request for another communication session, such as the previous communication session. The request may include the indication of the time duration and the session information. For example, the request for another communication session, such as the previous communication session, may be based on Transport Layer Security (TLS) protocol and include the indication of the time duration as a TLS timeout value. The network device may establish another communication session, such as the previous communication session, based on determining that session information is valid and the time duration is active.

The user device may transition from an active state, for example, while receiving the communication session, to an idle state (e.g., sleep mode, etc.). The user device may send the request to connect to the previous communication session based on the user device transitioning from the idle state (e.g., sleep mode, etc.) to the active state.

At 620, the time duration associated with the session information may be determined to be active. The network device may determine that the time duration is active.

At 630, the previous communication session may be established. The network device may establish the previous communication session based on the session information and the active time duration. The network device may determine that the time duration is active and that the session information is valid. The network device may, for example, establish the previous communication session, based on the valid session information and the active time duration, to enable the user device to connect (e.g., reconnect, etc.) to the previous communication session.

Figure 7:
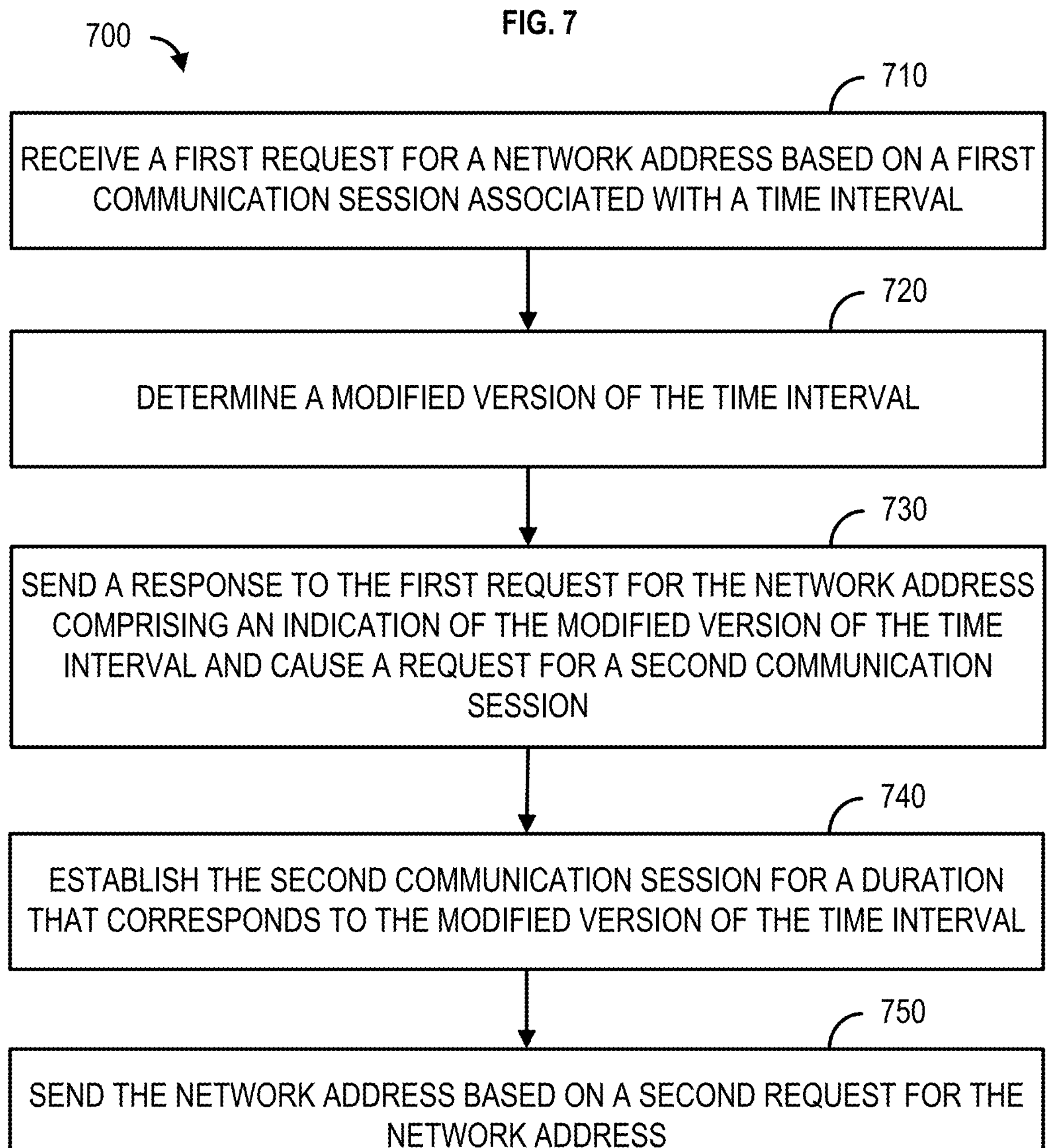
FIG. 7 shows a flowchart of an example method.

FIG. 7 shows a flowchart of a method 700 for communication session management. A user device (e.g., a client device, a DoH client, a smart device, a mobile device, a content output device, a computing device, a web browser, a search engine, the user device 102, etc.) may receive and/or engage/participate in extended/longer (or shorter) duration communication sessions than, for example, default Domain Name System over Hypertext Transfer Protocol Secure (DoH) communication sessions and/or Transport Layer Security (TLS) communication sessions. For example, a user device may receive and/or engage/participate in extended/longer (or shorter) duration communication sessions such as default Domain Name System over Hypertext Transfer Protocol Secure (DoH) communication sessions and/or Transport Layer Security (TLS) communication sessions based on a time duration value determined by a network device (e.g., a server, a domain name system (DNS) server, a DNS over hypertext transfer protocol secure (HTTPS) server (DoH server), a network management device, the network device 104, etc.). Use of the time duration determined by the network device may optimize and/or reduce latency associated with communication session requests, for example, communication sessions using DoH protocol, TLS protocol, and/or the like, and enable the user device to establish and/or re-establish (e.g., re-use, etc.) a communication session, such as if the user device establishes and/or re-establishes the communication session after an idle (e.g., sleep mode, etc.) period and/or the like.

At 710, a first request for a network address may be received. A network device (e.g., a server, a domain name system (DNS) server, a DNS over hypertext transfer protocol secure (HTTPS) server (DoH server), a network management device, the network device 104, etc.) may receive a first request for a network address from a user device (e.g., a client device, a DoH client, a smart device, a mobile device, a content output device, a computing device, a web browser, a search engine, the user device 102, etc.). The first request for the network address may be based on a first communication session. The first communication session may be associated with a time duration, such as a default time duration and/or the like. The first communication session may be, for example, based on a handshake communication protocol between the network device and the user device such as a Transport Layer Security (TLS) protocol and/or the like.

At 720, a modified version of the time duration may be determined. The network device may determine a modified version of the time duration. Determining the modified version of the time duration may include the network device determining that a request for the first communication session is an initial request for the first communication session. The network device may determine, based on the request for the first communication session being the initial request, the modified version of the time duration.

A request for the first communication session may indicate a device type of the user device, a location of the user device, an application associated with the user device, a configuration of the user device, and/or the like. The network device may determine, for example, the modified version of the time duration based on the device type of the user device, the location of the user device, an application associated with the user device, a configuration of the user device, and/or the like, the modified version of the time duration. The network device may determine the modified version of the time duration to accommodate the device type, the device location, the application, the configuration, and/or the like.

At 730, a response to the first request for the network address may be sent. The network device may send a response to the first request for the network address to the user device. The response may include an indication of the modified version of the time duration. The response may be configured to cause a request for a second communication session. For example, the response to the first request for the network address may include a Domain Name System over Hypertext Transfer Protocol Secure (DoH) 302 response.

At 740, the second communication session may be established. The network may establish the second communication session based on the request for the second communication session from the user device. The request for the second communication session may include the indication of the modified version of the time duration. The duration of the second communication session may correspond to the modified version of the time duration. The first communication session and the second communication session may be, for example, based on Transport Layer Security (TLS) protocol.

At 750, the network address may be sent. The network device may send the network address to the user device based on a second request for the network address. For example, the first request and the second request for the network address comprise Domain Name System over Hypertext Transfer Protocol Secure (DoH) requests. The network address may include, for example, an Internet protocol address. The network address may facilitate access to a service (e.g., a web service, etc.), content (e.g., a content item, a show, a program, a webpage, online content, etc.), a resource, and/or the like.

The method 700 may further include receiving a request for another network address. The network device may receive a request from the user device for another network address based on establishing the second communication session. The network device may send the another network address to the user device based on the request for the another network address and the modified version of the time duration being active. The another network address may facilitate access to a service (e.g., a web service, etc.), content (e.g., a content item, a show, a program, a webpage, online content, etc.), a resource, and/or the like.

FIG. 8 shows a flowchart of a method 800 for communication session management. A user device (e.g., a client device, a DoH client, a smart device, a mobile device, a content output device, a computing device, a web browser, a search engine, the user device 102, etc.) may receive and/or engage/participate in extended/longer (or shorter) duration communication sessions than, for example, default Domain Name System over Hypertext Transfer Protocol Secure (DoH) communication sessions and/or Transport Layer Security (TLS) communication sessions. For example, a user device may receive and/or engage/participate in extended/longer (or shorter) duration communication sessions such as default Domain Name System over Hypertext Transfer Protocol Secure (DoH) communication sessions and/or Transport Layer Security (TLS) communication sessions based on a time duration value determined by a network device (e.g., a server, a domain name system (DNS) server, a DNS over hypertext transfer protocol secure (HTTPS) server (DoH server), a network management device, the network device 104, etc.). Use of the time duration determined by the network device may optimize and/or reduce latency associated with communication session requests, for example, communication sessions using DoH protocol, TLS protocol, and/or the like, and enable the user device to establish and/or re-establish (e.g., re-use, etc.) a communication session, such as if the user device establishes and/or re-establishes the communication session after an idle (e.g., sleep mode, etc.) period and/or the like.

At 810, a first request for a network address may be sent. A user device (e.g., a client device, a DoH client, a smart device, a mobile device, a content output device, a computing device, a web browser, a search engine, the user device 102, etc.) may send a first request for a network address once a first communication session with a network device (e.g., a server, a domain name system (DNS) server, a DNS over hypertext transfer protocol secure (HTTPS) server (DoH server), a network management device, the network device 104, etc.) is established. The first communication session may be, for example, based on a handshake communication protocol between the network device and the user device such as a Transport Layer Security (TLS) protocol and/or the like. The network address may be an IP address, and/or the like. The first communication session is associated with a time duration, such as a default time duration.

At 820, receiving, based on the first request for the network address, an indication of a modified version of the time duration. For example, a modified version of the time duration may be determined. The network device may determine a modified version of the time duration. Determining the modified version of the time duration may include the network device determining that a request for the first communication session is an initial request for the first communication session. The network device may determine, based on the request for the first communication session being the initial request, the modified version of the time duration.

A request for the first communication session may indicate a device type of the user device, a location of the user device, an application associated with the user device, a configuration of the user device, and/or the like. The network device may determine, for example, the modified version of the time duration based on the device type of the user device, the location of the user device, an application associated with the user device, a configuration of the user device, and/or the like, the modified version of the time duration. The network device may determine the modified version of the time duration to accommodate the device type, the device location, the application, the configuration, and/or the like.

The network device may send the indication of the modified version of the time duration. The indication of the modified version of the time duration may cause the user device to terminate the first communication session and request a second communication session. For example, receiving the indication of the modified version of the time duration may include receiving a Domain Name System over Hypertext Transfer Protocol Secure (DoH) 302 response including the indication of the modified version of the time duration.

At 830, the second communication session may be received. The user device may receive and/or communicate via the second communication session. The network device may establish the second communication session based on a request for the second communication session. The request for the second communication session may include the indication of the modified version of the time duration. For example, a Transport Layer Security (TLS) timeout value of the request for the second communication session may indicate the modified version of the time duration. A duration of the second communication session may correspond to the modified version of the time duration. The network device may establish the second communication session (e.g., a TLS session, etc.) for the duration of the modified version of the time duration.

At 840, the network address may be received. The user device may receive the network address based on the second communication session and a second request for the network address. The first request and the second request for the network address may include Domain Name System over Hypertext Transfer Protocol Secure (DoH) requests, for example, sent to the network device by the user device.

The method 800 may further include sending, via the second communication session, a request for another network address. For example, the user device may transition from a sleep state and/or idle state and send a request to the network device for another network address. The user device may receive based on the request for the another network address and the modified version of the time duration being active, the another network address. The another network address may facilitate access to a service (e.g., a web service, etc.), content (e.g., a content item, a show, a program, a webpage, online content, etc.), a resource, and/or the like.

FIG. 9 shows a flowchart of a method 900 for communication session management. A user device (e.g., a client device, a DoH client, a smart device, a mobile device, a content output device, a computing device, a web browser, a search engine, the user device 102, etc.) may receive and/or engage/participate in extended/longer (or shorter) duration communication sessions than, for example, default Domain Name System over Hypertext Transfer Protocol Secure (DoH) communication sessions and/or Transport Layer Security (TLS) communication sessions. For example, a user device may receive and/or engage/participate in extended/longer (or shorter) duration communication sessions such as default Domain Name System over Hypertext Transfer Protocol Secure (DoH) communication sessions and/or Transport Layer Security (TLS) communication sessions based on a time duration value determined by a network device (e.g., a server, a domain name system (DNS) server, a DNS over hypertext transfer protocol secure (HTTPS) server (DoH server), a network management device, the network device 104, etc.). Use of the time duration determined by the network device may optimize and/or reduce latency associated with communication session requests, for example, communication sessions using DoH protocol, TLS protocol, and/or the like, and enable the user device to establish and/or re-establish (e.g., re-use, etc.) a communication session, such as if the user device establishes and/or re-establishes the communication session after an idle (e.g., sleep mode, etc.) period and/or the like.

At 910, a response including an indication of a modified version of a time duration may be sent. A network device (e.g., a server, a domain name system (DNS) server, a DNS over hypertext transfer protocol secure (HTTPS) server (DoH server), a network management device, the network device 104, etc.) may send a response including an indication of a modified version of a time duration to a user device (e.g., a client device, a DoH client, a smart device, a mobile device, a content output device, a computing device, a web browser, a search engine, the user device 102, etc.). The network device may send the response via a first communication session associated with a time duration, based on a first request for a first network address, and the response may be configured to cause the user device to request a second communication session.

For example, the network device may receive the first request for the first network address from the user device. The request for the first network address may be based on the first communication session. The first communication session may be, for example, based on a handshake communication protocol (and/or associated session) between the network device and the user device such as a Transport Layer Security (TLS) protocol and/or the like. The network device may determine the modified version of the time duration. Determining the modified version of the time duration may include the network device determining that a request for the first communication session is an initial request for the first communication session. The network device may determine, based on the request for the first communication session being the initial request, the modified version of the time duration. A request for the first communication session may indicate a device type of the user device, a location of the user device, an application associated with the user device, a configuration of the user device, and/or the like. The network device may determine, for example, the modified version of the time duration based on the device type of the user device, the location of the user device, an application associated with the user device, a configuration of the user device, and/or the like, the modified version of the time duration. The network device may determine the modified version of the time duration to accommodate the device type, the device location, the application, the configuration, and/or the like.

The network device may send a response to the first request for the first network address to the user device. The response may include an indication of the modified version of the time duration. The response may be configured to cause a request for a second communication session. For example, the response to the first request for the first network address may include a Domain Name System over Hypertext Transfer Protocol Secure (DoH) 302 response.

At 920, the second communication session may be established. The network device may establish the second communication session based on the request for the second communication session. The request for the second communication session may include the indication of the modified version of the time duration. For example, a Transport Layer Security (TLS) timeout value of the request for the second communication session may indicate the modified version of the time duration. The duration of the second communication session may correspond to the modified version of the time duration. The first communication session and the second communication session may be, for example, based on Transport Layer Security (TLS) protocol.

At 930, the first network address may be sent. The network device may send the first network address based on a second request from the user device for the first network address. The first network address may be, for example, an IP address and/or the like. The first network address may facilitate access to a service (e.g., a web service, etc.), content (e.g., a content item, a show, a program, a webpage, online content, etc.), a resource, and/or the like. The first request and the second request for the first network address may include Domain Name System over Hypertext Transfer Protocol Secure (DoH) requests.

At 940, a second network address may be sent. The network device may send the second network address to the user device. For example, the network device may send the second network address to the user device based on a request for the second network address and determining that the modified version of the time duration is active and/or via the second communication session. The duration of the second communication session may correspond to the modified version of the time duration. For example, the user device may transition from a sleep state and/or idle state and send the request for the second network address to the network device. The second network address may facilitate access to a service (e.g., a web service, etc.), content (e.g., a content item, a show, a program, a webpage, online content, etc.), a resource, and/or the like. For example, the first network address may facilitate access to first content and/or the like, and the second network address may facilitate access to second content and/or the like.

Figure 10:
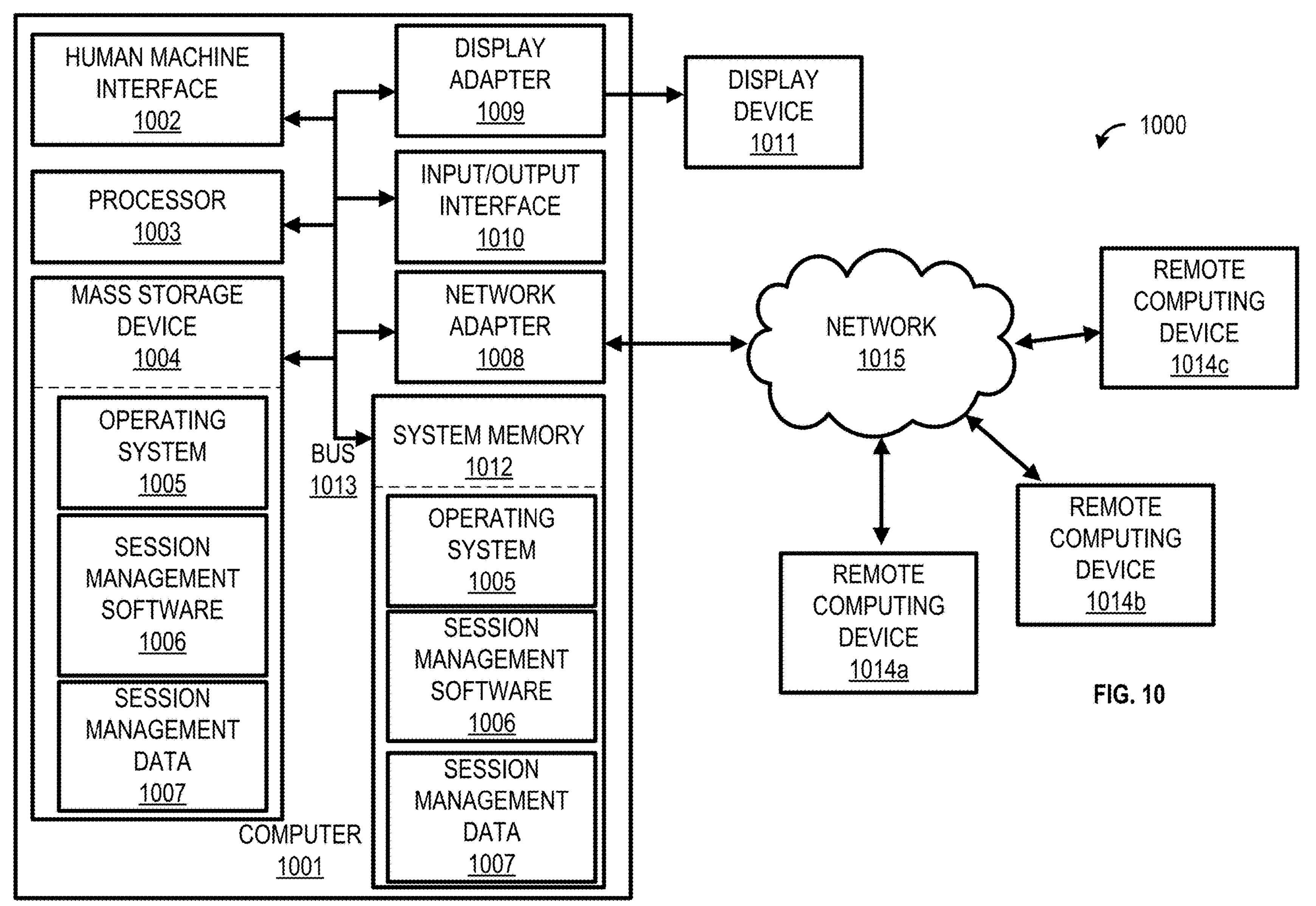
FIG. 10 shows a block diagram of a computing device for implementing example methods.

FIG. 10 shows a system 1000 for communication session management. The user device 102 and the network device 104 (FIG. 1) may be a computer 1001 as shown in FIG. 10.

The computer 1001 may comprise one or more processors 1003, a system memory 1012, and a bus 1013 that couples various components of the computer 1001 including the one or more processors 1003 to the system memory 1012. In the case of multiple processors 1003, the computer 1001 may utilize parallel computing.

The bus 1013 may comprise one or more of several possible types of bus structures, such as a memory bus, memory controller, a peripheral bus, an accelerated graphics port, and a processor or local bus using any of a variety of bus architectures.

The computer 1001 may operate on and/or comprise a variety of computer-readable media (e.g., non-transitory). Computer-readable media may be any available media that is accessible by the computer 1001 and comprises, non-transitory, volatile and/or non-volatile media, removable and non-removable media. The system memory 1012 has computer-readable media in the form of volatile memory, such as random access memory (RAM), and/or non-volatile memory, such as read-only memory (ROM). The system memory 1012 may store data such as session management data 1007 and/or program modules such as operating system 1005 and session management software 1006 that are accessible to and/or are operated on by the one or more processors 1003.

The computer 1001 may also comprise other removable/non-removable, volatile/non-volatile computer storage media. The mass storage device 1004 may provide non-volatile storage of computer code, computer-readable instructions, data structures, program modules, and other data for the computer 1001. The mass storage device 1004 may be a hard disk, a removable magnetic disk, a removable optical disk, magnetic cassettes or other magnetic storage devices, flash memory cards, CD-ROM, digital versatile disks (DVD) or other optical storage, random access memories (RAM), read-only memories (ROM), electrically erasable programmable read-only memory (EEPROM), and the like.

Any number of program modules may be stored on the mass storage device 1004. An operating system 1005 and session management software 1006 may be stored on the mass storage device 1004. One or more of the operating system 1005 and session management software 1006 (or some combination thereof) may comprise program modules and the session management software 1006. Session management data 1007 may also be stored on the mass storage device 1004. Session management data 1007 may be stored in any of one or more databases known in the art. The databases may be centralized or distributed across multiple locations within the network 1015.

A user may enter commands and information into the computer 1001 via an input device (not shown). Such input devices include, but are not limited to, a keyboard, pointing device (e.g., a computer mouse, remote control), a microphone, a joystick, a scanner, tactile input devices such as gloves, and other body coverings, motion sensor, and the like These and other input devices may be connected to the one or more processors 1003 via a human-machine interface 1002 that is coupled to the bus 1013, but may be connected by other interface and bus structures, such as a parallel port, game port, an IEEE 1394 Port (also known as a Firewire port), a serial port, network adapter 1008, and/or a universal serial bus (USB).

A display device 1011 may also be connected to the bus 1013 via an interface, such as a display adapter 1009. It is contemplated that the computer 1001 may have more than one display adapter 1009 and the computer 1001 may have more than one display device 1011. A display device 1011 may be a monitor, an LCD (Liquid Crystal Display), a light-emitting diode (LED) display, a television, smart lens, smart glass, and/or a projector. In addition to the display device 1011, other output peripheral devices may comprise components such as speakers (not shown) and a printer (not shown) which may be connected to the computer 1001 via Input/Output Interface 1010. Any step and/or result of the methods may be output (or caused to be output) in any form to an output device. Such output may be any form of visual representation, including, but not limited to, textual, graphical, animation, audio, tactile, and the like. The display 1011 and computer 1001 may be part of one device, or separate devices.

The computer 1001 may operate in a networked environment using logical connections to one or more remote computing devices 1014*a,b,c*. A remote computing device 1014*a,b,c* may be a personal computer, computing station (e.g., workstation), portable computer (e.g., laptop, mobile phone, tablet device), smart device (e.g., smartphone, smartwatch, activity tracker, smart apparel, smart accessory), security and/or monitoring device, a server, a router, a network computer, a peer device, edge device or other common network nodes, and so on. Logical connections between the computer 1001 and a remote computing device 1014*a,b,c* may be made via a network 1015, such as a local area network (LAN) and/or a general wide area network (WAN). Such network connections may be through a network adapter 1008. A network adapter 1008 may be implemented in both wired and wireless environments. Such networking environments are conventional and commonplace in dwellings, offices, enterprise-wide computer networks, intranets, and the Internet.

Application programs and other executable program components such as the operating system 1005 are shown herein as discrete blocks, although it is recognized that such programs and components may reside at various times in different storage components of the computing device 1001, and are executed by the one or more processors 1003 of the computer 1001. An implementation of session management 1006 may be stored on or sent across some form of computer-readable media. Any of the disclosed methods may be performed by processor-executable instructions embodied on computer-readable media.

Figure 11:
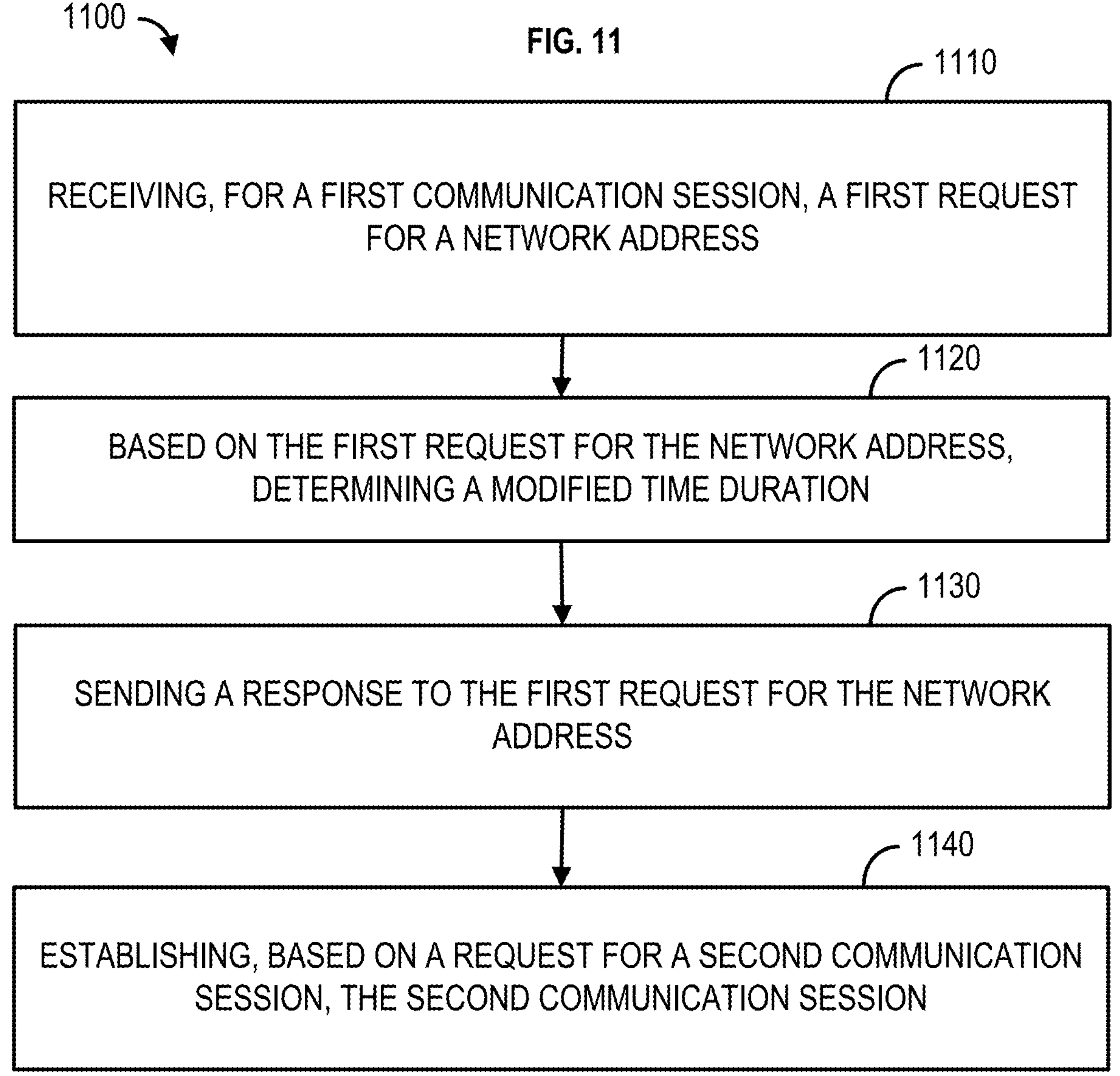
FIG. 11 shows a flowchart of an example method.

FIG. 11 shows a flowchart of a method 1100 for communication session management. A user device (e.g., a client device, a DoH client, a smart device, a mobile device, a content output device, a computing device, a web browser, a search engine, the user device 102, etc.) may receive and/or engage/participate in extended/longer (or shorter) duration communication sessions than, for example, default Domain Name System over Hypertext Transfer Protocol Secure (DoH) communication sessions and/or Transport Layer Security (TLS) communication sessions. For example, a user device may receive and/or engage/participate in extended/longer (or shorter) duration communication sessions such as default Domain Name System over Hypertext Transfer Protocol Secure (DoH) communication sessions and/or Transport Layer Security (TLS) communication sessions based on a time duration value determined by a network device (e.g., a server, a domain name system (DNS) server, a DNS over hypertext transfer protocol secure (HTTPS) server (DoH server), a network management device, the network device 104, etc.). Use of the time duration determined by the network device may optimize and/or reduce latency associated with communication session requests, for example, communication sessions using DoH protocol, TLS protocol, and/or the like, and enable the user device to establish and/or re-establish (e.g., re-use, etc.) a communication session, such as if the user device establishes and/or re-establishes the communication session after an idle (e.g., sleep mode, etc.) period and/or the like.

At 1110, a first request for a network address may be received. A network device (e.g., a server, a domain name system (DNS) server, a DNS over hypertext transfer protocol secure (HTTPS) server (DoHI server), a network management device, the network device 104, etc.) may receive a first request for a network address from a user device (e.g., a client device, a DoH client, a smart device, a mobile device, a content output device, a computing device, a web browser, a search engine, the user device 102, etc.). The first request for the network address may be based on a first communication session. The first communication session may be associated with a time duration, such as a default time duration and/or the like. The first communication session may be, for example, based on a communication protocol between the network device and the user device such as a Transport Layer Security (TLS) protocol and/or the like.

At 1120, a modified version of the time duration (e.g., a modified time duration) may be determined. The network device may determine a modified version of the time duration. Determining the modified version of the time duration may include the network device determining that a request for the first communication session is an initial request for the first communication session. The network device may determine, based on the first request for the network address, the modified version of the time duration or as otherwise described herein.

A request for the network address or the first communication may indicate a device type of the user device, a location of the user device, an application associated with the user device, a configuration of the user device, and/or the like. The network device may determine, for example, the modified version of the time duration based on the device type of the user device, the location of the user device, an application associated with the user device, a configuration of the user device, and/or the like, the modified version of the time duration. The network device may determine the modified version of the time duration to accommodate the device type, the device location, the application, the configuration, and/or the like.

At 1130, a response to the first request for the network address may be sent. The network device may send a response to the first request for the network address to the user device. The response may include an indication of the modified version of the time duration. The response may be configured to cause a request for a second communication session, establish a second communication session, or provide credentials, or other information, for establishing the second communication session. For example, the response to the first request for the network address may include a Domain Name System over Hypertext Transfer Protocol Secure (DoH) 302 response.

At 1140, the second communication session may be established. The network may establish the second communication session based on the request for the second communication session from the user device. The request for the second communication session may include the indication of the modified version of the time duration. The duration of the second communication session may correspond to the modified version of the time duration. The first communication session and the second communication session may be, for example, based on Transport Layer Security (TLS) protocol.

FIG. 12 shows a flowchart of a method 1200 for communication session management. A user device (e.g., a client device, a DoH client, a smart device, a mobile device, a content output device, a computing device, a web browser, a search engine, the user device 102, etc.) may receive and/or engage/participate in extended/longer (or shorter) duration communication sessions than, for example, default Domain Name System over Hypertext Transfer Protocol Secure (DoH) communication sessions and/or Transport Layer Security (TLS) communication sessions. For example, a user device may receive and/or engage/participate in extended/longer (or shorter) duration communication sessions such as default Domain Name System over Hypertext Transfer Protocol Secure (DoH) communication sessions and/or Transport Layer Security (TLS) communication sessions based on a time duration value determined by a network device (e.g., a server, a domain name system (DNS) server, a DNS over hypertext transfer protocol secure (HTTPS) server (DoH server), a network management device, the network device 104, etc.). Use of the time duration determined by the network device may optimize and/or reduce latency associated with communication session requests, for example, communication sessions using DoH protocol, TLS protocol, and/or the like, and enable the user device to establish and/or re-establish (e.g., re-use, etc.) a communication session, such as if the user device establishes and/or re-establishes the communication session after an idle (e.g., sleep mode, etc.) period and/or the like.

At 1210, a first request for a network address may be sent. A user device (e.g., a client device, a DoH client, a smart device, a mobile device, a content output device, a computing device, a web browser, a search engine, the user device 102, etc.) may send a first request for a network address once a first communication session with a network device (e.g., a server, a domain name system (DNS) server, a DNS over hypertext transfer protocol secure (HTTPS) server (DoH server), a network management device, the network device 104, etc.) is established. The first communication session may be, for example, based on a communication protocol between the network device and the user device such as a Transport Layer Security (TLS) protocol and/or the like. The network address may be an IP address, and/or the like. The first communication session is associated with a time duration, such as a default time duration.

At 1220, receiving, based on the first request for the network address, an indication of a modified version of the time duration. For example, a modified version of the time duration may be determined. The network device may determine a modified version of the time duration. Determining the modified version of the time duration may include the network device determining that a request for the first communication session is an initial request for the first communication session. The network device may determine, based on the request for the first communication session being the initial request, the modified version of the time duration.

The first communication session or communications over the first communication session may indicate a device type of the user device, a location of the user device, an application associated with the user device, a configuration of the user device, and/or the like. The network device may determine, for example, the modified version of the time duration based on the device type of the user device, the location of the user device, an application associated with the user device, a configuration of the user device, and/or the like, the modified version of the time duration. The network device may determine the modified version of the time duration to accommodate the device type, the device location, the application, the configuration, and/or the like.

The network device may send the indication of the modified version of the time duration. The indication of the modified version of the time duration may cause the user device to terminate the first communication session and request a second communication session. For example, receiving the indication of the modified version of the time duration may include receiving a Domain Name System over Hypertext Transfer Protocol Secure (DoH) 302 response including the indication of the modified version of the time duration.

At 1230, the second communication session may be established. The network may establish the second communication session based on the modified time duration. The duration of the second communication session may correspond to the modified version of the time duration. As an example, the second communication session may timeout after the modified time duration has lapsed, closing the second communication session. The modified time duration may be longer than the original time duration such that the second communication session is pending for longer than the first communication session. The extended pendency may allow the user device 102 to idle or sleep while the second communication session is maintained by the network device 104, enabling the user device 102 to wake and receive information (e.g., a network address) over the second communication session without reestablishing the communication session. The first communication session and the second communication session may be, for example, based on Transport Layer Security (TLS) protocol.

At 1240, a network address may be received. The network address received may be the network address requested over the first communication session. The network address received may be another network address requested over the second communication session. The network address may be requested over either the first communication session or the second communication session. The network address or the another network address may be received after the user device after idling or sleeping without requiring the second communication session to be reestablished. The user device may receive the network address based on the second communication session and a second request for the network address. The first request and the second request for the network address may include Domain Name System over Hypertext Transfer Protocol Secure (DoH) requests, for example, sent to the network device by the user device.

The method 1200 may further include sending, via the second communication session, a request for another network address. For example, the user device may transition from a sleep state and/or idle state and send a request to the network device for another network address. The user device may receive based on the request for the another network address and the modified version of the time duration being active, the another network address. The another network address may facilitate access to a service (e.g., a web service, etc.), content (e.g., a content item, a show, a program, a webpage, online content, etc.), a resource, and/or the like.

FIG. 13 shows a flowchart of a method 1300 for communication session management. A user device (e.g., a client device, a DoH client, a smart device, a mobile device, a content output device, a computing device, a web browser, a search engine, the user device 102, etc.) may receive and/or engage/participate in extended/longer (or shorter) duration communication sessions than, for example, default Domain Name System over Hypertext Transfer Protocol Secure (DoH) communication sessions and/or Transport Layer Security (TLS) communication sessions. For example, a user device may receive and/or engage/participate in extended/longer (or shorter) duration communication sessions such as default Domain Name System over Hypertext Transfer Protocol Secure (DoH) communication sessions and/or Transport Layer Security (TLS) communication sessions based on a time duration value determined by a network device (e.g., a server, a domain name system (DNS) server, a DNS over hypertext transfer protocol secure (HTTPS) server (DoH server), a network management device, the network device 104, etc.). Use of the time duration determined by the network device may optimize and/or reduce latency associated with communication session requests, for example, communication sessions using DoH protocol, TLS protocol, and/or the like, and enable the user device to establish and/or re-establish (e.g., re-use, etc.) a communication session, such as if the user device establishes and/or re-establishes the communication session after an idle (e.g., sleep mode, etc.) period and/or the like.

At 1310, a response comprising an indication of a modified time duration may be received. A user device (e.g., a client device, a DoH client, a smart device, a mobile device, a content output device, a computing device, a web browser, a search engine, the user device 102, etc.) may receive the indication based on a request for a network address once a first communication session with a network device (e.g., a server, a domain name system (DNS) server, a DNS over hypertext transfer protocol secure (HTTPS) server (DoH server), a network management device, the network device 104, etc.) is established. The first communication session may be, for example, based on a communication protocol between the network device and the user device such as a Transport Layer Security (TLS) protocol and/or the like. The network address may be an IP address, and/or the like. The network address may be based on a domain name service request. The first communication session is associated with a time duration, such as a default time duration.

The first communication session or communications over the first communication session may indicate a device type of the user device, a location of the user device, an application associated with the user device, a configuration of the user device, and/or the like. The network device may determine, for example, the modified version of the time duration based on the device type of the user device, the location of the user device, an application associated with the user device, a configuration of the user device, and/or the like, the modified version of the time duration. The network device may determine the modified version of the time duration to accommodate the device type, the device location, the application, the configuration, and/or the like.

At 1330, the second communication session may be established. The network may establish the second communication session based on the modified time duration. The duration of the second communication session may correspond to the modified version of the time duration. As an example, the second communication session may timeout after the modified time duration has lapsed, closing the second communication session. The modified time duration may be longer than the original time duration such that the second communication session is pending for longer than the first communication session. The extended pendency may allow the user device 102 to idle or sleep while the second communication session is maintained by the network device 104, enabling the user device 102 to wake and receive information (e.g., a network address) over the second communication session without reestablishing the communication session. The first communication session and the second communication session may be, for example, based on Transport Layer Security (TLS) protocol.

The network device may send the indication of the modified version of the time duration. The indication of the modified version of the time duration may cause the user device to terminate the first communication session and request a second communication session. For example, receiving the indication of the modified version of the time duration may include receiving a Domain Name System over Hypertext Transfer Protocol Secure (DoH) 302 response including the indication of the modified version of the time duration.

At 1330, sleeping or idling may occur. The idling may be after the second communication session is established. The idling longer than the time duration associated with the first communication session. Idling may only relate to the status of the second communication session. For example, data over the second communication session may not be transmitted, sent or received, while the second communication session is idling. As an example, the user device 102 may be operating normally and only not requesting DNS requests over the second communication session. As another example, the user device 102 or portion thereof (e.g., network adapter) may be asleep, in a low power mode, or turned off.

At 1340, a network address may be received. The network address received may be the network address requested over the first communication session. The network address received may be another network address requested over the second communication session. The network address may be requested over either the first communication session or the second communication session. The network address or the another network address may be received after the user device after idling or sleeping without requiring the second communication session to be reestablished. The user device may receive the network address based on the second communication session and a second request for the network address. The first request and the second request for the network address may include Domain Name System over Hypertext Transfer Protocol Secure (DoH) requests, for example, sent to the network device by the user device.

The method 1300 may further include sending, via the second communication session, a request for another network address. For example, the user device may transition from a sleep state and/or idle state and send a request to the network device for another network address. The user device may receive based on the request for the another network address and the modified version of the time duration being active, the another network address. The another network address may facilitate access to a service (e.g., a web service, etc.), content (e.g., a content item, a show, a program, a webpage, online content, etc.), a resource, and/or the like.

While specific configurations have been described, it is not intended that the scope be limited to the particular configurations set forth, as the configurations herein are intended in all respects to be possible configurations rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow;

plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

The invention claimed is:

1. An apparatus comprising:
- one or more processors; and
- a memory storing processor-executable instructions that, when executed by the one or more processors, cause the apparatus to:
  - receive a request for a network address associated with a communication session;
  - based on the request for the network address, determine a time duration; and
  - send a response to the request for the network address, wherein the response comprises an indication of the time duration for the communication session, and wherein the communication session is established based on the time duration.

2. The apparatus of claim 1, wherein the network address facilitates access to at least one of a service, content, or a resource.

3. The apparatus of claim 1, wherein the processor-executable instructions that, when executed by the one or more processors, cause the apparatus to determine the time duration, further cause the apparatus to:
- determine that a request for the communication session is an initial request; and
- determine, based on the request being the initial request, the time duration.

4. The apparatus of claim 1, wherein the request indicates a device type, wherein the processor-executable instructions that, when executed by the one or more processors, cause the apparatus to determine the time duration, further cause the apparatus to determine, based on the device type, the time duration.

5. The apparatus of claim 1, wherein the request comprises Domain Name System over Hypertext Transfer Protocol Secure (DoH) requests.

6. The apparatus of claim 1, wherein the response comprises a Domain Name System over Hypertext Transfer Protocol Secure (DoH) 302 response.

7. The apparatus of claim 1, wherein a Transport Layer Security (TLS) timeout value of a request for the communication session indicates the time duration.

8. The apparatus of claim 1, wherein the communication session is based on Transport Layer Security (TLS) protocol.

9. The apparatus of claim 1, wherein the processor-executable instructions, when executed by the one or more processors, further cause the apparatus to:
- receive a request for a second network address; and
- send, based on the request for the second network address and a second time duration being active, the second network address, wherein the second network address facilitates access to at least one of a service, content, or a resource.

10. One or more non-transitory computer-readable media storing processor-executable instructions that, when executed by at least one processor, cause the at least one processor to:
- receive a request for a network address associated with a communication session;
- based on the request for the network address, determine a time duration; and
- send a response to the request for the network address, wherein the response comprises an indication of the time duration for the communication session, and wherein the communication session is established based on the time duration.

11. The non-transitory computer-readable media of claim 10, wherein the network address facilitates access to at least one of a service, content, or a resource.

12. The non-transitory computer-readable media of claim 10, wherein the processor-executable instructions that, when executed by the at least one processor, cause the at least one processor to determine the time duration, further cause the at least one processor to:
- determine that a request for the communication session is an initial request; and
- determine, based on the request being the initial request, the time duration.

13. The non-transitory computer-readable media of claim 10, wherein the request indicates a device type, wherein the processor-executable instructions that, when executed by the at least one processor, cause the at least one processor to determine the time duration, further cause the at least one processor to determine, based on the device type, the time duration.

14. The non-transitory computer-readable media of claim 10, wherein the request comprises Domain Name System over Hypertext Transfer Protocol Secure (DoH) requests.

15. The non-transitory computer-readable media of claim 10, wherein the response comprises a Domain Name System over Hypertext Transfer Protocol Secure (DoH) 302 response.

16. The non-transitory computer-readable media of claim 10, wherein a Transport Layer Security (TLS) timeout value of a request for the communication session indicates the time duration.

17. The non-transitory computer-readable media of claim 10, wherein the communication session is based on Transport Layer Security (TLS) protocol.

18. The non-transitory computer-readable media of claim 10, wherein the processor-executable instructions, when executed by the at least one processor, further cause the at least one processor to:
- receive a request for a second network address; and
- send, based on the request for the second network address and a second time duration being active, the second network address, wherein the second network address facilitates access to at least one of a service, content, or a resource.

19. An apparatus comprising:
- one or more processors; and
- a memory storing processor-executable instructions that, when executed by the one or more processors, cause the apparatus to:
  - send a request for a network address associated with a communication session;
  - receive, based on the request for the network address, a response comprising an indication of a time duration for the communication session, wherein the communication session is established based on the time duration; and
  - receive, based on the communication session, the network address.

20. The apparatus of claim 19, wherein the time duration is based on a request for the communication session being an initial request for the communication session.

21. The apparatus of claim 19, wherein a request for the communication session indicates at least one of a device type or a device location, wherein the time duration is based on at least one of the device type or the device location.

22. The apparatus of claim 19, wherein the request comprises Domain Name System over Hypertext Transfer Protocol Secure (DoH) requests.

23. The apparatus of claim 19, wherein the processor-executable instructions that, when executed by the one or more processors, cause the apparatus to receive the time duration, further cause the apparatus to receive a Domain Name System over Hypertext Transfer Protocol Secure (DoH) 302 response comprising the time duration.

24. The apparatus of claim 19, wherein a Transport Layer Security (TLS) timeout value of a request for the communication session indicates the time duration.

25. The apparatus of claim 19, wherein the communication session is based on Transport Layer Security (TLS) protocol.

26. The apparatus of claim 19, wherein the processor-executable instructions, when executed by the one or more processors, further cause the apparatus to:

send a request for a second network address; and receive, based on the request for the second network address and a second time duration being active, the second network address, wherein the second network address facilitates access to at least one of a service, content, or a resource.

27. One or more non-transitory computer-readable media storing processor-executable instructions that, when executed by at least one processor, cause the at least one processor to:

send a request for a network address associated with a communication session;

receive, based on the request for the network address, a response comprising an indication of a time duration for the communication session, wherein the communication session is established based on the time duration; and receive, based on the communication session, the network address.

28. The non-transitory computer-readable media of claim 27, wherein the time duration is based on a request for the communication session being an initial request for the communication session.

29. The non-transitory computer-readable media of claim 27, wherein a request for the communication session indicates at least one of a device type or a device location, wherein the time duration is based on at least one of the device type or the device location.

30. The non-transitory computer-readable media of claim 27, wherein the request comprises Domain Name System over Hypertext Transfer Protocol Secure (DoH) requests.

31. The non-transitory computer-readable media of claim 27 wherein the processor-executable instructions that, when executed by the at least one processor, cause the at least one processor to receive the time duration, further cause the at least one processor to receive a Domain Name System over Hypertext Transfer Protocol Secure (DoH) 302 response comprising the time duration.

32. The non-transitory computer-readable media of claim 27, wherein a Transport Layer Security (TLS) timeout value of a request for the communication session indicates the time duration.

33. The non-transitory computer-readable media of claim 27, wherein the communication session is based on Transport Layer Security (TLS) protocol.

34. The non-transitory computer-readable media of claim 27, wherein the processor-executable instructions, when executed by the at least one processor, further cause the at least one processor to:

send a request for a second network address; and receive, based on the request for the second network address and a second time duration being active, the second network address, wherein the second network address facilitates access to at least one of a service, content, or a resource.

* * * * *